US00RE49701E

(19) United States
(12) Reissued Patent
Serov et al.

(10) Patent Number: US RE49,701 E
(45) Date of Reissued Patent: Oct. 17, 2023

(54) MATERIALS WITH ATOMICALLY DISPERSED CHEMICAL MOIETIES

(71) Applicants: Alexey Serov, Albuquerque, NM (US); Plamen Atanassov, Irvine, CA (US)

(72) Inventors: Alexey Serov, Albuquerque, NM (US); Plamen Atanassov, Irvine, CA (US)

(73) Assignee: UNM Rainforest Innovations, Albuquerque, NM (US)

(21) Appl. No.: 15/929,642

(22) Filed: May 14, 2020

Related U.S. Patent Documents

Reissue of:
(64) Patent No.: 10,619,256
Issued: Apr. 14, 2020
Appl. No.: 15/551,563
PCT Filed: Feb. 16, 2016
PCT No.: PCT/US2016/018102
§ 371 (c)(1),
(2) Date: Aug. 16, 2017
PCT Pub. No.: WO2016/133921
PCT Pub. Date: Aug. 25, 2016

U.S. Applications:
(60) Provisional application No. 62/116,845, filed on Feb. 16, 2015.

(51) Int. Cl.
*C25B 11/04* (2021.01)
*C25B 1/04* (2021.01)
(Continued)

(52) U.S. Cl.
CPC ..... *C25B 11/095* (2021.01); *B01D 53/326* (2013.01); *B01J 19/087* (2013.01);
(Continued)

(58) Field of Classification Search
CPC .. C02F 1/4672; C02F 1/46109; C02F 1/4676; C02F 2001/46142; B01D 53/326; C25B 11/051; C25B 11/095; C25B 1/04; C25B 11/04; C25B 3/25; C25B 1/00; C25B 11/057; B01J 19/087; B01J 31/12;
(Continued)

(56) References Cited

U.S. PATENT DOCUMENTS 9,180,443 B1 11/2015 Serov et al.
9,359,681 B1 6/2016 Serov et al.
(Continued)

FOREIGN PATENT DOCUMENTS

WO WO-2012/174344 * 12/2012 ..... B09J 31/12
WO WO-2013116754 A1 * 8/2013 ..... B01J 37/08
WO WO-2014011831 A1 * 1/2014 ..... B01J 23/745

OTHER PUBLICATIONS

Santoro et al. (Double-Chamber Microbial Fuel Cell with a Non-Platinum-Group Metal Fe—N—C Cathode Catalyst, ChemSusChem, p. 828-34, ePub Jan. 21, 2015 (Year: 2015).*
(Continued)

*Primary Examiner* — Ling X Xu
(74) *Attorney, Agent, or Firm* — Gonzales Patent Services; Ellen Gonzales

(57) ABSTRACT

Synthetic materials that are useful as heterogeneous catalysts or electrocatalysts. The materials can be used to catalyze oxidation and/or reduction reactions and/or oxygen/hydrogen evolution/oxydation reactions.

21 Claims, 11 Drawing Sheets

(51) Int. Cl.

| | |
|---|---|
| ***B01J 31/12*** | (2006.01) |
| ***C25B 1/00*** | (2021.01) |
| ***B01D 53/32*** | (2006.01) |
| ***B01J 19/08*** | (2006.01) |
| ***C02F 1/461*** | (2023.01) |
| ***C02F 1/467*** | (2023.01) |
| ***C25B 3/01*** | (2021.01) |
| ***C25B 11/095*** | (2021.01) |
| ***C25B 11/057*** | (2021.01) |
| ***C25B 11/051*** | (2021.01) |
| ***C25B 3/25*** | (2021.01) |

(52) U.S. Cl.

CPC ..... *B01J 31/12* (2013.01); *C02F 1/4672* (2013.01); *C02F 1/4676* (2013.01); *C02F 1/46109* (2013.01); *C25B 1/00* (2013.01); *C25B 1/04* (2013.01); *C25B 3/25* (2021.01); *C25B 11/04* (2013.01); *C25B 11/051* (2021.01); *C25B 11/057* (2021.01); *B01J 2219/0803* (2013.01); *B01J 2219/0875* (2013.01); *B01J 2219/0877* (2013.01); *B01J 2219/0892* (2013.01); *C02F 2001/46142* (2013.01); *Y02E 60/36* (2013.01); *Y02W 10/37* (2015.05)

(58) Field of Classification Search

CPC ..... B01J 2219/0877; B01J 2219/0875; B01J 2219/0892; B01J 2219/0803; Y02E 60/36; Y02W 10/37

See application file for complete search history.

(56) References Cited

U.S. PATENT DOCUMENTS

| | | | | |
|---|---|---|---|---|
| 9,425,464 | B2 | 8/2016 | Serov et al. | |
| 9,634,331 | B2 | 4/2017 | Serov et al. | |
| 9,673,456 | B2 | 6/2017 | Serov et al. | |
| 10,784,548 | B2 * | 9/2020 | Santoro | C02F 1/4693 |
| 2012/0193222 | A1 * | 8/2012 | Mustain, Jr. | C25B 3/08 204/252 |
| 2014/0141286 | A1 * | 5/2014 | Bretschger | C02F 3/005 429/2 |

OTHER PUBLICATIONS

Liu et al., Photochemical Route for Synthesizing Atomically Dispersed Palladium Catalysts, (May 12, 2016) Science 352 (6287), 797-800.

Shi et al., Site-specific electrodeposition enables self-terminating growth of atomically dispersed metal catalysts Nature Communications (2020) 11:4558.

Liang et al., "Mesoporus Metal-Nitrogen-Doped Carbon Electrocatalysts for Highly Efficient Oxygen Reduction Reaction," J. Am. Chem. Soc. 2013, 135, 16002-16005. (Year: 2013).*

Kang et al., "Synergy among manganese, nitrogen and carbon to improve the catalytic activity for oxygen reduction reaction," Journal of Power Sources 251 (2014) 363-369. (Year: 2014).*

Serov et al. Fe—N—C Oxygen Reduction Fuel Cell Catalyst Derived From Carbendazim: Synthesis, Structure, and Reactivity; Adv. Energy Mater. 2014.

* cited by examiner

MATERIALS WITH ATOMICALLY DISPERSED CHEMICAL MOIETIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The following application claims benefit of U.S. Provisional Application No. 62/116,845, filed Feb. 16, 2015, which is hereby incorporated by reference in its entirety.

STATEMENT REGARDING GOVERNMENT SPONSORED RESEARCH

This invention was made with Government support under DOD-Grant No. W911NF1410263 awarded by ARO to University of Utah with a sub-award to the University of New Mexico. The U.S. Government has certain rights in this invention.

BACKGROUND

Oxidation and reduction reactions are of great use in a variety of areas including for the production of energy, removal and/or conversion of unwanted compounds or chemicals, and the generation of desirable products. These reactions typically use catalysts to enhance a chemical reaction either electrochemically, wherein electrons are transferred from one chemical species to another or homogeneous/heterogeneously, where chemical reactions are facilitated by the active sites of a catalyst. Oxidation is the result of a loss of electrons or an increase in oxidation state while reduction is the result of a gain in electrons or a decrease in the oxidation state.

Catalysis can be either homogenous or heterogeneous. Homogenous catalysis is where the catalytic reactions take place in the same phase as the reactants. Most typically, homogenous catalysis takes place in solution and thus requires the chemical or compound undergoing the reaction to be in solution with a soluble catalyst. In contrast, heterogeneous catalysis is when catalysis takes place in the interface of two phases, typically: gas-solid, gas-solvent, solvent-solid etc, and thus allows for the chemical or compound undergoing the reaction to be in the gas (solution) phase while the catalyst is typically solid.

A number of desirable oxidation and reduction reactions have thus far only been shown to be catalyzed by homogenous catalysis. Examples include carbon monoxide oxidation, carbon dioxide conversion reactions and oxyfuel oxidation/reduction reactions.

Carbon dioxide ($CO_2$) is generated in substantial quantities by carbon based energy generating processes such as burning methane (and other hydrocarbons) or coal which account for 82% of the worldwide energy supply in 2014. The accumulation of atmospheric $CO_2$ can be attributed to the unregulated and continuous rate of its release since the industrial revolution, resulting in an increase in concentration from 278 ppm to 400 ppm. The current concentration of $CO_2$ strains the balance of the earth's natural carbon cycle, resulting in acidified oceans and irregular weather patterns.

Climate models predict drastic changes in precipitation and temperature, which will impact regional and global economies. A general consensus that $CO_2$ emissions will continue requires the development of technologies that will result in ambitious emission reductions over the next few decades. Current solutions to decrease $CO_2$ emissions include increasing the percentage of energy generated from renewable or nuclear sources and utilizing $CO_2$ capture and storage (CCS) at point sources (e.g. power plants) which can be extended to $CO_2$ capture and conversion (CCC) into fuels or value added products. See, e.g., UNEP 2013. The Emission Gap Report 2013. United Nations Environmental Programme (UNEP), Nairobi; Sanchez-Sanchez C M et al., Electrochemical approaches to alleviation of the problem of carbon dioxide accumulation. Pure Appl. Chem. 2001; 73:1917-1927; and Lim R J, et al., A review on the electrochemical reduction of $CO_2$ in fuel cells, metal electrodes and molecular catalyst. Catal. Today. 2014; 233:169-180. CCC would transform carbon emitting energy sources into carbon neutral processes by reintroducing $CO_2$ into the energy cycle, a process that can be implemented in batch or flow reactors as shown in the selective reduction of $CO_2$ to formic acid in optimized electrochemical systems with high conversion rates on Pb (94.1%) and Sn (70-80%) (See, e.g., Lowry D, et al., Electroreduction of Carbon Dioxide in Electrochemically Enabled Sustainability: devices, materials, and mechanisms for energy conversion; Chan K Y, C Y. V Eds. Taylor & Francis Group, LLC, 2014, 1-54) and the "one-pot" synthesis of controlled molar ratios of $H_2$ and CO (syn-gas) on Ag (See, e.g., Delacourt C, Newman J. Mathematical modeling of $CO_2$ reduction to CO in aqueous electrolytes II. Study of an electrolysis cell making syngas ($CO+H_2$) from $CO_2$ and $H_2O$ at room temperature. J. Electrochem. Soc. 2010; 157:B1911-B1926. Delacourt C, et al., Design of an Electrochemical Cell Making Syngas ($CO+H_2$) from $CO_2$ and $H_2O$ Reduction at Room Temperature, J. Electrochem. Soc. 2008; 155:B42-B49; and Dufek E J, et. al., Bench-scale electrochemical system for generation of CO and syn-gas. J. Appl. Electrochem. 2011; 41:623-631). Further CCC could be integrated with intermittent renewable energy sources (e.g., solar or wind) to store energy as reduced $CO_2$ in liquid or gas products for later use.

Similarly, the importance of oxalic acid, especially for clinical diagnosis and in food and water technology, is now widely recognized. Small carboxylic or dicarboxylic acids (such as formic, maleic, and acetic acids) are intermediate products in catalytic oxidation of aromatic compounds present in wastewater. At the same time oxalic acid is a compound that is toxic to almost all organisms. The accumulation of oxalic acid causes hyperoxaluria, formation of calcium oxalate stones in the kidney, renal failure, cardiomyopathy, and cardiac conductance disorders.

Electrochemical oxidation of organic compounds is a widely used approach for wastewater purification, energy production, and synthesis of value added products. Metal oxides, like copper, zinc, manganese and supported noble metals, like platinum group metals (PGM) or zinc, are used as catalysts in these processes due to their high activity and lack of selectivity. Platinum and ruthenium carbon supported catalysts are shown to be efficient for the oxidation of different carboxylic acids. For example, oxalic acid can be oxidized using platinum in mild experimental conditions and pH=0 at potential values between 0.7 and 1.8 V vs. RHE with a maximum catalytic activity at 1.3 V Unfortunately use of noble metal catalysts such as platinum group metals is expensive, which hinders their large-scale application for wastewater purification. In addition, in metal-catalyzed oxidation there is a risk of irreversible deactivation due to the modifications of the metal surface in the course of reactions by metal sintering or poisoning of the surface by strongly adsorbed species such as oxygen. Metal leaching away in the solution is another known problem with the use of composite metal oxides.

The ability to engage in electroreduction, electrooxidation or electrochemical conversion of compounds such as carbon dioxide, carbon monoxide, and hydrogen electrooxidation or evolution (HOR and HER, respectively) and oxidation/reduction of oxyfuels in, for example, the gas phase via the use of heterogeneous catalysts (or electrocatalysts) is highly desirable as this pathway would open up significant avenues for processing of these compounds in phases in which they are commonly found.

SUMMARY

According to an embodiment the present disclosure provides synthetic materials that are useful as heterogeneous catalysts or electrocatalysts. According to various embodiments, the materials can be used to catalyze oxidation and/or reduction reactions and/or oxygen/hydrogen evolution/oxydation reactions. Such catalysts can be useful for a wide variety of applications including, but not limited to, the removal or conversion of Carbon dioxide ($CO_2$) and other undesirable compounds including different airborne contaminants and greenhouse gases, in air, water, or the general environment, energy production, and synthesis of value added products.

BRIEF DESCRIPTION OF THE DRAWINGS

FIG. 2a shows $MnN_4$.

FIG. 2b shows $MnN_3C$.

FIG. 2c shows a first structure for $MnN_2C_2$.

FIG. 2d shows a second structure for $MnN_2C_2$.

FIG. 2e shows $MnN_3$.

DETAILED DESCRIPTION

Figure 1:
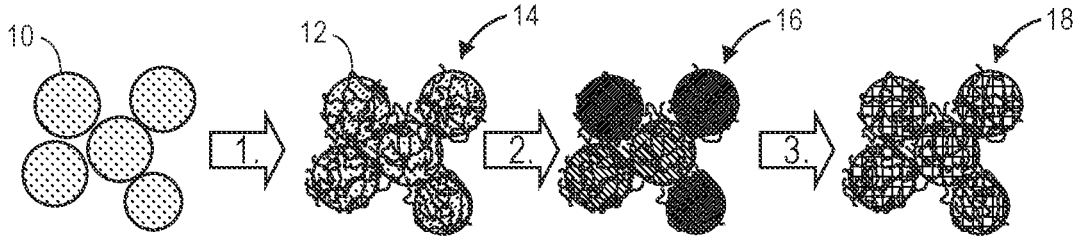
FIG. 1 is a schematic illustration of the sacrificial support method (SSM) described in the present disclosure.
Figure 2A:
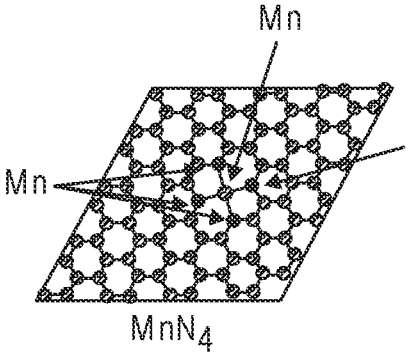
FIGS. 2a-2e show various coordinations of a manganese (Mn) atom with nitrogen (N) and carbon (C).
Figure 2B:
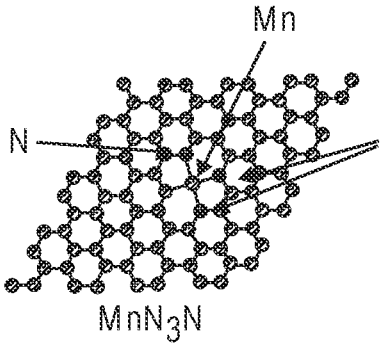
Figure 2C:
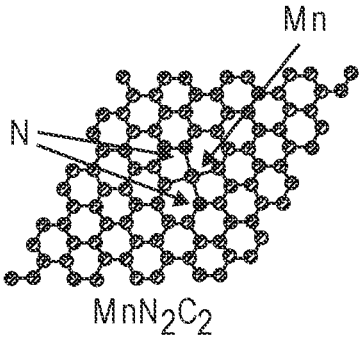
Figure 2D:
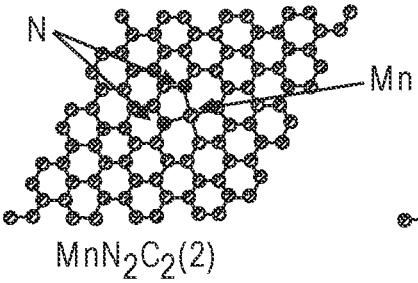
Figure 2E:
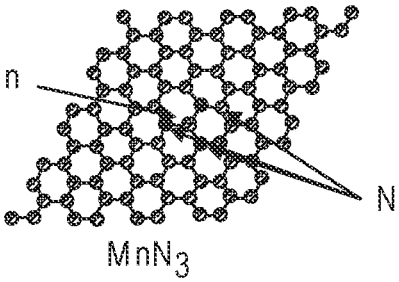

According to an embodiment the present disclosure provides synthetic materials that are useful as catalysts or electrocatalysts. According to various embodiments, the materials can be used to catalyze reduction, oxidation, and conversion reactions and/or oxygen evolution/oxidation reactions (HOR, HER, ORR and OER). Such catalysts can be useful for a wide variety of applications including, but not limited to, the removal or conversion of Carbon dioxide (CO2) and other undesirable compounds in the air, water, or general environment, energy production, and synthesis of value added products as well HOR, HER, ORR and OER According to a more specific embodiment, the synthetic materials are heterogeneous Metal-HeteroAtom-Carbon (M-X—C, where X=N, C, B, P, S, Se or O) catalysts/electrocatalyst. The materials can be synthesized using a sacrificial support based method as described below. In general, the materials are structured to display a plurality of Metal-Nitrogen/Metal-Carbon/Metal-Oxide centers ($M-N_X$/M-C/M-O, M-X: where X=N, C, B, P, S, Se or O) in a graphene-like (or in a generally carbonaceous) matrix. Moreover, according to some embodiments, the materials are engineered to include one or more one- or two-metal sites (or "defects"). As specific examples, the materials of the present disclosure may be engineered to include one or more $M-X_3$ (single metal atom connected to three X atoms), $M-X_4$ (single metal atom connected to 4 hetero-atoms), $M-X_3C$ (single metal atom connected to three X and one carbon atom), $M-X_2C_2$ (single metal atom connected to two X and two carbon atoms), $M1-M2-X_5$ (first and second metal atoms connected to five nitrogen atoms) or $M1-M2-N_4$ (first and second metal atoms connected to four X atoms) sites.

According to still further embodiments, the materials may be engineered to include three or more different metal in any particular site.

According to still another embodiment, the present disclosure provides a mechanisms for engineering graphene-like (carbon-based) materials having predetermined sites in order to replicate and study the catalytic behavior of various types of MX sites so as to be able to predict, evaluate, and or design catalytic materials.

For the sake of clarity, in the present application the term "catalyst" is used to refer to a final product, which catalyzes a desired reaction or reactions, including, for example, the type of electrocatalytic or chemical reactions required for use in various types of fuel cells, electrolyzers, CO2 scrubbers, electrochemical reactors, wastewater reclamation plants, etc. The catalyst may include multiple types of materials, including, for example a catalytic materials combined with an active or inactive supporting material. Catalytic materials which do not include or require a separate supporting material are considered to be unsupported or self-supported materials.

For the purposes of the present disclosure, the term "catalytic material" is any material which contains one or more active sites that enable catalysis or electrocatalysis. Examples of catalyzed reactions are the electrochemical; Oxygen Reduction Reaction (ORR) and Oxygen Evolution Reaction (OER), hydrogen oxidation and reduction reactions (HOR and HER), chemical conversion such as hydrogenation/dehydrogenation etc.

For the purposes of the present disclosure, the term "active site" is used to describe chemical species on the surface of a catalyst/electrocatalyst and/or active support that participate in the catalyzed reaction. It will be understood that different types of active sites may use different types of catalytic pathways. For example, for electrochemical oxygen reduction some active sites follow a 4 electron (4 e) pathway, while others follow a 2 electron (2 e) pathway. The same concept can be applied to CO2 conversion, HOR, HER etc.

According to a more specific example, a catalytic material according to the present disclosure may be synthesized utilizing a sacrificial template-based method as shown in FIG. 1. For the purposes of the present disclosure, the term "sacrificial template" is intended to refer to a material that is included during the synthesis process in order to provide temporary structure but which is mostly or entirely removed by the end of the synthesis process. According to one embodiment of this particular method, the M-X—C precursors 12 are allowed to interact with, for example by coating, infusing or otherwise mixing with) sacrificial template particles 10 under suitable conditions such that a hybrid material containing the sacrificial template particles 14 is formed (step 1). At step 2, the hybrid/template particle mixture is then subjected to heat treatment, such as pyrolysis, oxidation, reduction or reaction, to form a rigid three-dimensional structure containing metal, heteroatom, carbon, and sacrificial template particles 16. The sacrificial template particles are then removed, resulting in a porous three-dimensional material 18 wherein the pores are the voids that are produced by the removal of the template particles/aggregates/agglomerates.

For the purposes of the present disclosure, the term "precursor" is used to refer to one or more compounds which participate in an interaction by contributing one or more atoms to a compound that is formed as the product of the chemical/physical reaction or otherwise contributes to the formation of the product. For example in providing atoms or chemical moieties that help to create the chemical structure of the final product.

It will be appreciated that the present disclosure often makes reference to "M-X—C precursors." It should be understood that such terminology is used to refer to any single or group of precursors which, taken as a whole, contain suitable metal, heteroatoms, and carbon atoms which are available for chemical synthesis and, at least some of which, are incorporated into the final product. Accordingly, an "M-X—C precursor" may refer to a metal-heteroatom-and-carbon-containing precursor; or to a metal-containing precursor and a heteroatom-and-carbon-containing precursor; or a metal-and-heteroatom-containing precursor and a carbon-containing precursor; or a metal-and-carbon-containing precursor and a heteroatom-containing precursor; or a metal-containing precursor, a heteroatom-containing precursor, and carbon-containing precursor, so long as the metal, heteroatom, and carbon, are available for chemical synthesis.

According to an embodiment, the M-X—C precursors of the present disclosure typically include exclusively or inclusively compounds containing heteroatom, carbon and metal precursors (including platinum group metals). Suitable heteroatom and carbon containing compounds include, for example, metal free pyridines, porphyrins and metal-containing porphyrin and pyridine-containing macrocycles including, but not limited, to, N-Phenyl-1-naphthylamine, Melamine, 4-Amino antipyrine, Poly(acrylamide-co-diallyldimethylammonium chloride), Poly(2-ethyl-2-oxazoline), Niclosamide. Pyrazinecarboxamide, Quinine hydrochloride dehydrate, Ricobendazole, Streptomycin sulfate salt, Succinylsulfathiazole, Sulfacetamide, Sulfachloropyridazine, Sulfadiazine, Sulfaguanidine, Carbadox, Chlorhexidine diacetate salt hydrate, Chloroquine diphosphate salt, 6,9-Diamino-2-ethoxyacridine-DL-lactate monohydrate, Diethylcarbamazine citrate salt, Furazolidone, etc. Exemplary characteristics which may be examined with regard to the selection of the heteroatom, carbon, or heteroatom-carbon precursors used for producing the catalysts as described herein include, but are not limited to: (1) carbon richness; (2) heteroatom richness; and (3) thermal stability, i.e. the volatility of the molecules and resistance to decomposition due to heating. The degree of carbon richness is related to the porosity of the final product. For example, according to some embodiments, a porous, open-frame matrix will be formed if each molecule of the carbon precursor contains, on average, at least 5 carbon atoms. Depending on whether the plan is to perform synthesis in an inert or heteroatom-rich environment, the heteroatom richness of the precursor may need to be taken into account. For example, if synthesis is to be performed in an inert atmosphere, the precursor must have a substantial amount of heteroatom, since all the M-$X_x$ centers must be formed from heteroatoms contained in the precursor itself. Finally, precursors should be chosen which will remain stable under the thermal conditions to be used. For example, if the methodology to be used requires pyrolysis at a temperature of above 400° C. (a minimum temperature frequently required for active-site formation), it is important that the precursor remain stable at temperatures above 400° C.

According to a specific embodiment, the one or more metals used in the material are selected from the group consisting of transition metals. In general, transition metals are identified as the 38 elements in groups 3 through 12 of the periodic table. Suitable, exemplary transition metals include Fe, Ce, Cr, Cu, Co, Mo, Ni, Ru, Pd, Pt, Ir, Rh, Os, Ag, Au, Re, Ta, Ti, V, W, Mn, Zn, Sn, Sb, In, Ga, Bi, Pb, and Zr. (It will be noted that while many of the examples herein refer to the use of manganese, iron, chromium, cobalt, and copper (Mn, Fe, Cr, Co, Cu etc) as the transition metals, other transition metals, including those identified above, can be substituted in place of the identified element, by simply using precursors of those metals instead. Examples of transition metal precursors include, but are not limited to manganese nitrate, manganese sulfate, manganese acetate, manganese chloride, iron nitrate, iron sulfate, iron acetate, iron chloride, cerium nitrate, chromium nitrate, copper nitrate, ammonium molybdate, nickel nitrate, ruthenium chloride, tantalum isopropoxide, titanium ethoxide, vanadium sulfate, ammonium tungstate and zirconium nitrate and chlorides, acetates, sulfates of any transition metals from the group mentioned above. Furthermore, as evidenced by the data in the example section below, according to some embodiments the presently described methodologies may utilize precursors of two or more metals to produce multi-metallic or multi-heteroatomic materials.

It will be appreciated that the catalytic materials of the present disclosure may be synthesized and mixed (or coated, or infused, etc.) in a single synthesis step or the sacrificial template may be synthesized first (or otherwise obtained) and then mixed with the M-X—C precursors. The M-X—C precursor/sacrificial template mixture is then subjected to heat treatment, (such as pyrolysis) in an inert ($N_2$, Ar, He, etc.) or reactive ($H_2$, $NH_3$, acetonitrile, borane, phosphine etc.) atmosphere.

Of course it will be appreciated that given the temperatures that the sacrificial template will be subjected to during the synthesis method, it is important to select a template material which is non-reactive to the catalytic materials under the specific synthesis conditions used and the removal of which will not damage the active sites. Silica (magnesia, clay, zeolites, titania etc) are materials which are known to easily withstand the conditions described herein while remaining inert to the catalytic materials described and which can be removed using techniques that are harmless to the active sites. Materials such as these are referred to herein as Sacrificial Support ("SS") material. It will be understood that sacrificial template particles can be made from any suitable SS material. Of course, while many of the examples herein utilize silica for the templating materials, it will be appreciated that other suitable materials may be used including, but are not limited to, zeolites, aluminas, and the like. According to various embodiments, the template particles may take the form of any one, two- or three-dimensional regular, irregular, or indifferent shapes, including, but not limited to, spheres, cubes, cylinders, cones, etc. The particles may be monodisperse, or irregularly sized. Furthermore, the particles may or may not be porous and any pores may be of the same or different sizes and shapes.

It will be appreciated that the size and shape of the template particles may be selected according to the desired shape(s) and size(s) of the voids within the final catalyst product. Specifically, it will be understood that by selecting the particular size and shape of the template particles, one can produce an electrocatalyst having voids of a predictable size and shape. For example, if the template particles are spheres, the electrocatalyst will contain a plurality of spherical voids having the same general size as the spherical template particles. For example, in an embodiment where SS particles having an average diameter of 20 nm is used, the spherical voids in the electrocatalyst/catalyst will typically have an average diameter of approximately 20 nm. (Those of skill in the art will understand that if the diameter of the particle is 20 nm, the internal diameter of the void in which the particle resided will likely be just slightly larger than 20 nm and thus the term "approximately" is used to account for this slight adjustment.)

As stated above, according to some embodiments, sacrificial particles of any diameter may be used. In some preferred embodiments, sacrificial particles having a characteristic length of between 1 nm and 100 nm may be used, in more preferred embodiments, SS particles having characteristic lengths of between 100 nm and 1000 nm may be used and in other preferred embodiments, silica particles having characteristic lengths of between 1 mm and 10 mm may be used.

According to some specific embodiments, 20 nm diameter spheres formed from mesoporous silica can also be used in the templating synthesis approach. In this case the templating involves intercalating the mesopores of the silica template material and results in a self-supported electrocatalysts with porosity in the 2-20 nm range. In one particular embodiment, the silica template is Cab-o-sil™ LM150 silica (surface area SA=150 $m^2/g$). Those of skill in the art will be familiar with a variety of SS particles that are commercially available, and such particles may be used. Alternatively, known methods of forming silica particles may be employed in order to obtain particles of the desired shape and/or size.

According to some embodiments, sacrificial particles may first be dispersed in a buffer using, for example, a low-energy ultrasonic bath to form a colloidal solution. It will be appreciated that such dispersion of the sacrificial particles results in individual particles being separated from each other within the bath, thereby preventing the formation of a single monolithic block or several large clumps of sacrificial particles. Of course it will be understood that other methods for dispersing or otherwise separating the sacrificial particles so as to avoid the presence of monolithic blocks or clumps of particles could also be used including other methods for stirring or mixing the precursors and sacrificial template particles. It will also be understood that the degree of separation or clumping of the sacrificial particles can further be controlled by the methods of dispersion or mixing.

An X—C precursor such as 4-aminoantipyrine (AAPyr) also may be suspended in a buffer prior to addition to the dispersed sacrificial particle—containing buffer. It will be understood that the same or different buffers can be used, but the buffers will typically be compatible and non-reactive with each other and the various precursors and sacrificial particles.

A solution containing the transition metal precursor (e.g., a salt of the desired transition metal) may then be added to the X—C-precursor-sacrificial support solution under suitable conditions to enable formation of a gel. According to one specific example the metal salt solution is added to the sacrificial support/X—C suspension and ultrasonicated for 8 hours. The gel can then be dried at a controlled temperature and ground to a fine powder.

The powder can then be heat treated either in an inert atmosphere such as $N_2$, Ar, or He, or in a reactive atmosphere such as $H_2$, $NH_3$, or acetonitrile. Inert atmospheres are typically used when the M-X—C materials are heteroatom rich, as the inert atmosphere enables the production of a high number of active sites with M-$X_x$ centers. However, it may be desired to use a heteroatom rich atmosphere if the M-X—C material is rich in carbon and depleted in heteroatom, as the heteroatom rich atmosphere will enable production of the M-$X_x$ centers.

According, to some embodiments, optimal temperatures for heat treatment (pyrolysis, oxidation or reduction) are typically between 100° C. and 1200° C. According to some embodiments, heat treatment in the case of an inert atmosphere will preferably be between 850° C. and 1050° C., or more preferably between 900° C. and 1000° C. In some embodiments, heat treatment of around 950° C. is preferred. It should be noted that the combination of temperature and duration of the heat treatment can be important and thus, in some embodiments, a heat treatment of between 775° C. and 825° C. for 1 hour may be desirable, with an additional 15 minutes at 800° C. being equivalent to 825° C. According to some embodiments, heat treatment may be performed in an ultra-high purity nitrogen flow rate of 100 ml/min In the case of oxidation, the temperature the range can be 100-500 C, while a reactive atmosphere may require a temperature range of between 200-800° C. Furthermore, in some cases it may be desirable to ramp up the temperature, for example by increasing the temperature from room temperature to the desired final temperature by 25° per minute.

After heat treatment, the sacrificial template particles are removed resulting in a porous, self-supported material. In some cases the porous material consists only of materials derived from the initial M-X—C precursor materials. Removal of the sacrificial template particles may be achieved using any suitable means. For example, the template particles may be removed via chemical etching. Examples of suitable etchants include NaOH, KOH, and HF. According to some embodiments, it may be preferable to use KOH, as it preserves all metal and metal oxide in the material and use of KOH may, in fact, increase catalytic activity of the active centers. Alternatively, in some embodiments, HF may be preferred as it is very aggressive and can be used to remove some poisonous species from the surface of the support and/or to produce desirable reactive surface defects in the final material. Accordingly, those of skill in the all will be able to select the desired etchants based on the particular requirements of the supporting material being formed.

According to some embodiments, the methods may produce a material having multi-modal porosity. As a specific example, when the method described herein was used with the Cab-o-SIL™ LM150 silica (SA=150 $m^2/g$) as the template, and manganese nitrate and aminoantipyrine (AAPyr) as the precursors with a 25 wt % metal-loading on the silica particles, a highly graphitic three-dimensional graphene-like structure having a highly developed open-frame, sponge like structure having multi-modal porosity was observed. Specifically, the material contained both pores with a diameter of ~60-90 nm, which were created after removal of the sacrificial support, and smaller pores of ~10-15 nm, which were formed during the decomposition of the precursor. (See examples section, below.)

It will be appreciated that some in some applications it may be desirable to produce a multi-metallic catalytic material, for example, in order to produce a catalytic material containing more than one type of active site or to increase the catalytic selectivity, number of active sites while controlling costs, materials availability, or other factors. Accordingly, as indicated above, according to some embodiments, the presently described method may incorporate the use of precursors of multiple metals or multiple-heteroatomic precursors in order to achieve a desired activity, selectivity stability, cost-effectiveness or other factor.

Moreover the present disclosure provides methods for tuning the disclosed catalytic materials to include active sites which are more highly reactive towards the desired catalytic reaction. According to an embodiment, materials having specific active sites are engineered by atomic substitution of atoms on the edges of graphene sheets. For example, single metal active sites can be modeled by removing one carbon atom from the graphene in the case of $M\text{-}N_3$ sites and two adjacent carbon atoms in the case of $M\text{-}N_4$, $M\text{-}N_3C$, and $M\text{-}N_2C_2$ sites, respectively. The resulting internal edges can be substituted with 3N atoms in the case of $M\text{-}N_3$ and $M\text{-}N_3C$ sites, 4N atoms in the case of $M\text{-}N_4$ site, and 2N atoms in the case of $M\text{-}N_2C_2$ sites. The structures can be further coordinated to different transition metals, such as Fe, Ni, CO, Mn, Cu, Zn, Sn, Sb, and allowed to relax. Two-metal sites in which two TMs are coordinated with a different number of nitrogen and carbon atoms such as $M\text{-}M\text{-}N_5$ or $M\text{-}M\text{-}N_4$ sites can be similarly modeled. Similar two metal sites are proposed as viable defect structures in iron based M-X—C catalysts [78]. The above-described method can be applied to usage of heteroatoms such as boron, phosphorus, sulfur, oxygen etc.

The formation energies of the proposed M-X—C catalyst active sites can be calculated based on the following reaction:

$$C_{n-graphene} + \frac{m}{2}N_2 + yTM \rightarrow M_y - N_mC_{n-x} + C_x$$

where x is a number of C atoms substituted with N. The energy change can be calculated using the change in the electronic energy for the appropriate system i.e. the zero point energy and entropy corrections are not included. However, the changes in entropy is expected to be of the same order when comparing different defects and is therefore unlikely to significantly change the results. $C_{n\text{-}graphene}$, $N_mC_{n\text{-}x}$ and $M_y\text{-}N_mC_{n\text{-}x}$ correspond to the energies of the pristine graphene sheet, optimized graphene with defects, and optimized defects with transition metal incorporated, respectively. For electronic energies of carbon, nitrogen, and transition metal, the total energy per carbon atom for defect-free graphene, half of the total energy of $N_2$ molecule, and total energy of an isolated metal atom in the gas phase can be used. In this way, specific active sites having the metal atom coordinated to a specific number or nitrogen and/or carbon atoms can be created and studied. Of course other heteroatoms such as boron, phosphorus, sulfur, oxygen etc can be used instead of nitrogen.

Free energy diagrams at a certain pH on the surface of different catalysts can be calculated using the well-known approach of Nørskov et al. [79-81]. According to this approach, the change in free energy of the reaction can be calculated as:

$$\Delta G(U,pH)=\Delta E+\Delta ZPE+T\Delta S-neU-k_BT\ \ln\ 10pH$$

where ΔE is the change in the electronic energy, ΔZPE is the change in the zero point energy and ΔS is the change in the entropy of the reaction. The number of electrons exchanged in the reaction is denoted by n, and U is the electrode potential. This approach makes it possible to estimate the lower limit of the overpotential for an electrochemical reaction on a certain active site. All the electronic structure calculations can be performed using generalized gradient approximation (GGA) to density functional theory with the Perdew-Burke-Ernzerhof (PBE) functional and projector augmented-wave pseudopotentials as implemented in the Vienna Ab initio Software Package (VASP). This theory has also been used in previous DFT studies of non-PGM catalysts [75-77].

Core level shift can be calculated for most stable defects/active sites of M-X—C catalysts can be compared with experimentally obtained XPS spectra. The calculated values can be used to deconvolute any unresolved peaks in the experimental XPS spectra, which should make it possible to distinguish between different active sites in the synthesized catalysts. DFT with the PBE functional can be used to calculate the binding energies of nitrogen 1 s orbitals as the difference between computed orbital energy of the core level (BEN1s) and the Fermi level (EF) of the defect or active site structure:

$$BE=BE_{N1s}-E_F$$

Absolute binding energies are not meaningful because small misrepresentations of the electronic wave functions can lead to large deviations in orbital energies due to the steep Coulomb potential near the nucleus. To avoid this problem, binding, energies can be calculated relative to a reference system that is accessible to both experiment and theory, namely the N-pyridinic defect:

$$CLS=BE(site)-BE(reference)$$

The procedure described above can be applied to calculate the core level shifts of most stable defects in M-X—C catalysts. Comparison of density functional theory (DFT) analysis of the engineered active sites and the synthesized catalytic material can then provide information about the types of sites present in the synthesized catalytic material and the ratio of those sites to each other. Moreover, the engineered active sites and analysis thereof can be used to determine the types of sites which most readily catalyze a desired reaction, thereby providing guidance with regard to the synthesis of future catalytic materials. For example $M\text{-}X_4$ active centers which are more energetically favorable and can be formed by using heat treatment temperatures greater than 800 C, while $M\text{-}X_3$ active centers can be synthesized by using heat treatment temperatures in the range of 500-700 C.

According to an embodiment, the catalytic materials of the present disclosure are used as part of a heterogeneous electrocatalytic layer, for example in a reactor designed for electrolysis, reduction, oxidation reactions, oxygen, hydrogen oxidation or evolution reactions, $CO_2$ electrooxidation, CO reduction etc. According to a specific embodiment, the reactor may utilize gas diffusion electrodes with the above-described materials as catalysts. In general, the catalytic materials of the present disclosure are mixed with a binder to produce a catalytic ink which can then be coated onto a substrate for use as a heterogeneous electrocatalyst or chemical catalyst. Suitable types of binders include, for example, Nafion™ (DuPont), FAA3 (FumaTech) proton exchange style ionomers as well as AS4 and AS5 (Tokuyama) anion-exchange style ionomers and Polytetrafluoroethylene (PTFE). According to various embodiments, the amount of binder can vary between 10 to 65 wt % of solid in the final electrode structure. In general it should be noted that various reactions optimally occur at different desired pH values. For example, $CO_2$ electroreduction optimally occurs at neutral pH (i.e. a pH close to pH 7) and thus the crucial elements in a $CO_2$ electrolyzer/reactor, such as the catalyst, need to be able to perform at or around pH 6-8. Accordingly, it may be necessary, or desirable, to design the pore structure and chemical composition of the catalytic material (with or without the binder) to maintain pH close to neutral. As described above, the morphology of the catalytic material can easily be altered by selecting an appropriate template particle and/or a desirable ratio of M-X—C precursors to template particles. Moreover, the chemical structure (ratio of metal to heteroatoms to carbon) can easily be altered by selecting appropriate precursors and adjusting the ratios of precursors relative to each other.

Accordingly, the present disclosure provides a system for reduction, oxidation or transformation reactions, oxygen reduction and evolution reactions, hydrogen oxidation or evolution reactions or electrolysis. Those of skill in the art will understand that a near infinite variety of reactor configurations are available and readily used, but that the system as its most basic typically includes a reactant or "fuel" in a liquid or gas phase, which is then delivered to a heterogeneous solid phase catalyst under sufficient conditions that the heterogeneous solid phase catalyst is able to catalyze reduction, oxidation or transformation reactions, oxygen reduction and evolution reactions, hydrogen oxidation or evolution reactions or electrolysis of the fuel. The supply mechanism may be a simple delivery tube or passageway to a chamber containing the catalyst or even passive delivery such as by the presence of the catalyst as part of an electrode or cathode residing in a body of solvent or in air/oxygen environment. According to a specific embodiment, the system may be a stand-alone electrode or catalyst, as an electrode or catalytic part of a system, or used as part of a fuel cell, electrolyzer, scrubber, or other type of reactor. Of course, it will be understood that similar systems can be designed for each of the above-described types of reactions by selecting different fuels and reagents, an appropriate catalyst or/and support, and supplying various electrolytic layers, buffers, chambers, etc. as needed.

Accordingly, the present disclosure provides a method for chemically transforming a chemical or compound by delivering or exposing the chemical or compound in a first phase to a reactor comprising a catalyst in a second phase under sufficient conditions that the catalyst catalyzes an oxidation, reduction or conversion reaction, an oxygen reduction or evolution reaction, a hydrogen oxidation or evolution reaction, electrolysis, or other conversion wherein the catalyst is an M-X—C catalyst. According to a further embodiment, the M-X—C catalyst is a porous, self-supported solid-phase material comprising atomically dispersed transition metal moieties coordinated with heteroatomic moieties or heteroatomic and carbon moieties.

According to another embodiment the catalytic materials of the present disclosure are used as a catalyst in a system for the electrochemical conversion of oxalic acid in order to, for example, detect or remove oxalic acid in various environments including, but limited to wastewater treatment facilities and the like.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications as well as the following references:

S. Kabir, K. Artyushkova, A. Serov, B. Kiefer, P. Atanassov "Binding energy shifts or nitrogen-containing graphene-based electrocatalysts—experiments and DFT calculations", Surface and Interface Analysis (2016), DOI: 10.1002/sia.5935

S. Rojas-Carbonell, S. Babanovaa, S. Serov, Y. Ulyanova, S. Singhal, P. Atanassova "Hybrid electrocatalysts for oxygen reduction reaction: Integrating enzymatic and non-platinum group metal catalysis" 190 (2016) 504-510.

C. Santoro, F. Soavi, A. Serov, C. Arbizzani, P. Atanassov "Self-Powered Supercapacitive Microbial Fuel Cell: The Ultimate Way of Boosting and Harvesting Power", Biosensors and Bioelectronics 78 (2016) 229-235.

D. Sebastián, V. Baglio, A. S. Aricò, A. Serov, Plamen Atanassov, "Performance analysis of a non-platinum group metal catalyst based on iron-aminoantipyrine for direct methanol fuel cells", Appl. Catal. B: Environmental 182 (2016) 297-305.

C. Santoro, A. Serov, C. W. Narvaez Villarrubia, S. Stariha, S. Babanova, K. Artyushkova, A. J. Schuler, P. Atanassov, "High catalytic activity and pollutants resistivity using Fe-AAPyr cathode catalyst for microbial fuel cell application", Scientific Reports 5 (2015), Article number: 16596.

K. Artyushkova, A. Serov, S. Rojas-Carbonell, P. Atanassov, "Chemistry of Active Sites for Oxygen Reduction Reaction in Transition Metal-Nitrogen-Carbon Electrocatalysts", J. Phys. Chem. C, 119 (46) (2015), 25917-25928.

A. Zadick, L. Dubau, M. Chatenet, U. Demirci, A. Serov, P. Atanassov, "Instability Of Commercial Pt/C And Pd/C Electrocatalysts In Alkaline Media" ECS Transactions 69(17) (2015) 553-558.

A. Serov, N. I. Andersen, Sadia A. Kabir, A. Roy, T. Asset, M. Chatenet, F. Maillard, P. Atanassov, "Palladium Supported on 3D Graphene as an Active Catalyst for Alcohols Electrooxidation", J. Electrochem. Society, 162 (12) (2015), F1-F5.

N. D. Leonard, K. Artyushkova, B. Halevi, A. Serov, P. Atanassov, S. C. Bartona, "Modeling of Low-Temperature Fuel Cell Electrodes Using Non-Precious Metal Catalysts", J. Electrochem. Society 162 (2015), F1253-F1261.

C. Santoro, K. Artyushkova, I. Gajda, S. Babanova, A. Serov, P. Atanassov, J. Greenman, A. Colombo, S. Trasatti, I. Ieropoulos, P. Cristiani, "Cathode materials for ceramic based microbial fuel cells (MFCs)", Int. J. of Hydrogen Energy 40 (2015) 14706-14715.

A. Serov, K. Artyushkova, E. Niangar, C. Wang, N. Dale, F. Jaouen, M.-T. Sougrati, Q. Jia, S. Mukerjee, P. Atanassov, "Nano-structured non-platinum Catalysts For Automotive Fuel Cell Application", Nano Energy, 16 (2015) 293-300.

S. Stariha, K. Artyushkova, A. Serov, P. Atanassov, "Non-PGM membrane electrode assemblies: Optimization for performance", Int. J. Hydrogen Energy (2015), DOI: 10.1016/j.ijhydene.2015.05.185.

A. Zalineeva, A. Serov, M. Padilla, U. Martinez, K. Artyushkova, S. Baranton, C. Coutanceau, P. Atanassov, "Nano-structured Pd—Sn catalysts for alcohol electrooxidation in alkaline medium" Electrochem. Comm 57 (2015) 48-51.

A. Roy, A. Serov, K. Artyushkova, E. L. Brosha, P. Atanassov, T. L. Ward, "Facile Synthesis of High Surface Area Molybdenum Nitride and Carbide", J. of Solid State Chemistry 228 (2015) 232-238.

A Zalineeva, A Serov, M Padilla, U Martinez, K Artyushkova, S Baranton, C Coutanceau, Plamen B Atanassov, "Glycerol electrooxidation on self-supported Pd1Sn1-x nanoparticules", Appl. Catal. B: Environmental 176 (2015), 429-435.

M. J Workman, A. Serov, B. Halevi, P. Atanassov, K. Artyushkova, "Application of the Discrete Wavelet Transform to SEM and AFM Micrographs for Quantitative Analysis of Complex Surfaces", Langmuir 31 (17) (2015), 4924-4933.

R. Janarthanana, A. Serov, S. Kishore Pilli, D. A. Gamarra, P. Atanassov, M. R. Hibbs, A. M. Herring "Direct Methanol Anion Exchange Membrane Fuel Cell with a Non-Platinum Group Metal Cathode based on iron-Aminoantipyrine Catalyst", Electrochim Acta 175 (2015) 202-208.

I. Matanovic, S. Babanova, A. Perry III, A. Serov, K. Artyushkova, P. Atanassov "Bio-inspired design of electrocatalysts for oxalate oxidation: a combined experimental and computational study of Mn—N—C catalysts", Phys. Chem. Chem. Phys. 17 (2015) 13235-13244.

T. Sakamoto, D. Matsumura, K. Asazawa, U. Martinez, A. Serov, K. Artyushkova, P. Atanassov, K. Tamura, Y. Nishihata, H. Tanaka, "Operando XAFS study of carbon supported Ni, NiZn, and Co catalysts for hydrazine electrooxidation for use in anion exchange membrane fuel cells", Electrochim Acta, 163 (2015) 116-122.

A. Serov, K. Artyushkova, N. I. Andersen, S. Stariha, P. Atanassov "Original Mechanochemical Synthesis of Non-Platinum Group Metals Oxygen Reduction Reaction Catalysts Assisted by Sacrificial Support Method", Electrochim Acta 179 (2015) 154-160.

A. Serov, N. I. Andersen, A. J. Roy, I. Matanovic, K. Artyushkova, P. Atanassov, "CuCo2O4 ORR/OER Bi-Functional Catalyst: Influence of Synthetic Approach on Performance", J. of The Electrochem. Soc. 162 (4) (2015) F449-F454.

C. Santoro, A. Serov, C. W. Narvaez Villarrubia, S. Stariha, S. Babanova, A. J. Schuler, K. Artyushkova, P. Atanassov. "Double-Chamber Microbial Fuel Cell with a Non-Platinum-Group Metal Fe—N—C Cathode Catalyst", ChemSusChem 8 (2015) 828-834.

N. I. Andersen, A. Serov, P. Atanassov "Metal Oxides/CNT Nano-Composite Catalysts for Oxygen Reduction/Oxygen Evolution in Alkaline Media", Appl. Catal. B: Environmental 163 (2015) 623-627.

O. Baturina, Q. Lu, M. Padilla, L Xin, W. Li, A. Serov, P. Atanassov, F. Xu, A. Epshteyn, T. H. Brintlinger, M. Schuette, G. E. Collins, K. Artyushkova, "CO2 electroreduction to hydrocarbons on carbon-supported Cu nanoparticles", ACS Catal. 4 (10) (2014) 3682-3695.

A. Serov, M. Padilla, A. J. Roy, P. Atanassov, T. Sakamoto, K. Asazawa, H. Tanaka "Anode Catalysts for Direct Hydrazine Fuel Cells: From Laboratory Test to an Electric Vehicle", Angewandte Chemie Int. Ed. 126 (39) (2014) 10419-10715.

U. Martinez, A. Serov, M. Padilla, P. Atanassov, "Mechanistic Insight into Oxide-Promoted Palladium Catalysts for the Electro-Oxidation of Ethanol", ChemSusChem 7(8) (2014) 2351-2357.

U. Tylus, Q. Jia, K. Strickland, N. Ramaswamy, A. Serov, P. Atanassov, S. Mukerjee, "Elucidating Oxygen Reduction Active Sites in Pyrolyzed Metal-Nitrogen Coordinated Non-Precious Electrocatalyst Systems" J. Phys. Chem. C 118 (17) (2014) 8999-9008.

A. Serov, K. Artyushkova, P. Atanassov, "Fe—N—C Oxygen Reduction Fuel Cell Catalyst Derived from Carbendazim: Synthesis, Structure and Reactivity", Adv. Energy Mater. 4: 1301735 (2014) doi: 10.1002/aenm.201301735.

A. Zalineeva, A. Serov, M. Padilla, U. Martinez, K. Artyushkova, S. Baranton, C. Coutanceau, P. Atanassov "Self-supported PdxBi Catalysts for the Electrooxidation of Glycerol in Alkaline Media", J. Am. Chem. Soc. 136 (2014) 3937-3945.

A. Serov, U. Tylus, K. Artyushkova, S. Mukerjee, P. Atanassov "Mechanistic studies of oxygen reduction on Fe-PEI derived non-PGM electrocatalysts", Appl. Catal. B: Environmental 150 (2014) 179-186.

A. Serov, A. Aziznia, P. H. Benhangi, K. Artyushkova, P. Atanassov, E. Gyenge "Borohydride-tolerant oxygen electroreduction catalyst for mixed-reactant Swiss-roll direct borohydride fuel cells", J. Mater. Chem. A 1 (2013) 14384-14391.

A. Serov, U. Martinez, P. Atanassov "Novel Pd—In catalysts for alcohols electrooxidation in alkaline media" Electrochem. Comm 34 (2013) 185-188.

A. Serov, M. H. Robson, M. Smolnik, P. Atanassov "Trimetallic transition metal-nitrogen-carbon catalysts derived by sacrificial support method synthesis" Electrochim Acta 109 (2013) 433-439.

M. H. Robson, A. Serov, K. Artyushkova, P. Atanassov "A Mechanistic Study of 4-Aminoantipyrine and Iron Derived Non-Platinum Group Metal Catalyst on the Oxygen Reduction Reaction" Electrochim Acta 90 (2013) 656-665.

S. Brocato, A. Serov, P. Atanassov "pH Dependence of Catalytic Activity for ORR of the non-PGM Catalyst Derived from Heat-Treated Fe-Phenanthroline" Electrochim Acta 87 (2013) 361-365.

A. Serov, M. H. Robson, K. Artyushkova, P. Atanassov "Templated non-PGM cathode catalysts derived from iron and poly(ethyleneimine) precursors" Appl. Catal. B 127 (2012) 300-306.

A. Serov, M. H. Robson, M. Smolnik, P. Atanassov "Templated bi-metallic non-PGM catalysts for oxygen reduction" Electrochim Acta 80 (2012)213-218.

A. Serov, U. Martinez, A. Falase, P. Atanassov "Highly Active Pd—Cu Catalysts for Electrooxidation of 2-Propanol" Electrochem. Comm 22 (2012) 193-196.

A. Serov, M. H. Robson, B. Halevi, K. Artyushkova, P. Atanassov "Highly Active and Durable Templated Non-PGM Cathode Catalysts Derived from Iron and Aminoantipyrine" Electrochem. Comm 22 (2012) 53-56.

U. Martinez, K. Asazawa, B. Halevi, A. Falase, B. Kiefer, A. Serov, M. Padilla, T. Olson, A. Datye, H. Tanaka, P. Atanassov "Aerosol-derived Nil-xZnx electrocatalysts for direct hydrazine fuel cells", Phys. Chem. Chem. Phys. 14 (2012) 5512-5517.

A. Falase, M. Main, K. Garcia, A. Serov, C. Lau, P. Atanassov "Electrooxidation of ethylene glycol and glycerol by platinum-based binary and ternary nano-structured catalysts", Electrochim Acta 66 (2012) 295-301.

A. Serov, C. Kwak "Direct Hydrazine Fuel Cells: A Review", Applied Catalysis B: Environmental 98 (2010) 1-9.

A. Serov, C. Kwak "Recent Achievements in Direct Ethylene Glycol Fuel Cells (DEGFC)", Applied Catalysis B: Environmental 97 (2010) 1-12.

M. Min, Y. Park, C. Kwak, A. A. Serov, "Novel preparation method of composite catalyst composed of Pt wires and particles for low-temperature fuel cell applications", Electrochimica Acta 55 (2010) 737-742.

A. Serov, T. Nedoseykina, O. Shvachko, C. Kwak, "Effect of Precursor Nature on the Performance of Palladium-Cobalt Electrocatalysts for Direct Methanol Fuel Cells", J. Power Sources 195 (2010) 175-180.

A. Serov, C. Kwak "Progress in Development of Direct Dimethyl Ether Fuel Cells", Applied Catalysis B: Environmental 91 (2009) 1-10.

A. A. Serov, M. Min, G. Chai, S. Han, S. J. Seo, Y. Park, H. Kim, C. Kwak "Electroreduction of oxygen over iron macrocyclic catalysts for DMFC applications" J. Appl. Electrochem. 39 (2009) 1509-1516.

A. Serov, C. Kwak, "Review of non-platinum anode catalysts for DMFC and PEMFC application" Applied Catalysis B: Environmental 90 (2009) 313-320.

A. A. Serov, C. Kwak, "Synthesis, characterization and catalytic activity of RuFeSe/C as a cathode catalyst for low-temperature fuel cells" Catal. Comm 10 (2009) 1551-1554.

A. A. Serov, M. Min, G. Chai, S. Han, S. Kang, C. Kwak, "Preparation, characterization, and high performance of RuSe/C for direct methanol fuel cells", J. Power Sources 175 (2008) 175-182.

A. A. Serov, S.-Y. Cho, S. Han, M. Min, G. Chai, K. H. Nam, C. Kwak, "Modification of palladium-based catalysts by chalcogenes for direct methanol fuel cells", Electrochemistry Communications, 9 (2007) 2041-2044.

S. Han, J. W. Lee, C. Kwak, G. S. Chai, I. H. Son, M. Y. Jang, S. G. An, S. Y. Cho, J. Y. Kim, H. W. Kim, A A Serov, Y. Yoo, K. H. Nam, "High performance membrane-electrode assembly based on a surface-modified membrane", J. Power Sources, 167 (2007) 74-78.

M. Min, C. Park, H. Kim, C. Kwak, A. A. Serov, H. Kweon, S. Lee, "Nano-fabrication and characterization of new conceptual platinum catalysts for low temperature fuel cells", Electrochim Acta 52 (2006) 1670-1675.

Example I—MnAAPyr

Synthesis

MnAAPyr was synthesized using manganese nitrate and aminoantipyrine as precursors. Silica (Cab-O-Sil™ LM150, ~150 m2 g−1) was used as a support material in order to provide porosity of the catalyst at the macro scale. Initially, a dispersion of silica (metal loading on silica was calculated to be 25 wt %) into acetone was obtained by using a low-energy ultrasonic bath. Separately, a solution of 4-aminoantipyrine (Sigma-Aldrich) in acetone was prepared and added to the silica colloidal solution. The silica-AAPyr suspension was ultrasonicated for 40 minutes. A solution of Mn (II) nitrate (Mn(NO3)2*4H2O, Sigma-Aldrich) in distilled water was then added to the silica-AAPyr solution and ultrasonicated for about 8 hours. The gel formed containing silica-MnAAPyr was dried for 12 hours at controlled temperature (85° C.) and then grounded to a fine powder using a mortar. The following step was a heat treatment with temperature ramp rate of 25° C. per minute from room temperature to 950° C., followed by pyrolysis for 30 minutes. The heat treatment was done in High Purity (UHP) nitrogen with a flow rate of 100 ml min-1. Finally, silica sacrificial support was removed using hydrofluoric acid (HF, 20 wt. %) and the catalyst was then washed in distilled water and dried for 12 hours at controlled temperature (85° C.).

Ink Preparation

Ink composed of 1 wt. % MnAAPyr and 0.1 wt. % tetrabutylammonium bromide (TBAB)-Nafion® ionomer was prepared as follows. A suspension of 1 wt. % multi-walled carbon nanotube (MWNT obtained from cheaptubes.com) in 4:1 water:ethanol suspension (reagent grade, Sigma, St. Louis, Mo.) with the addition of 0.1 wt. %

TBAB-Nafion was bath ultrasonicated for 30 min. TBAB-Nafion® ionomer is a derivative of Nation® ionomer (DuPont) made by exchanging a proton in the sulfonic acid group for a TBAB salt.

Electrochemical Studies

The activity of the designed catalyst towards the oxidation of oxalic acid was studied using three-electrode setup. The working electrode was a glassy carbon rotating disk electrode onto which 20 μL of the prepared ink (See below) were drop casted and dried under $N_2$. Saturated Ag/AgCl was used as a reference and Pt-wire as a counter electrode. The electrolyte was composed of 0.1M potassium phosphate buffer with pH 4. To increase the conductivity of the solution 0.1M KCl was introduced as an indifferent electrolyte. Cyclic voltammetry (CV) was carried out by sweeping the potential in between −0.8-1.4 V vs. saturated Ag/AgCl electrode with a scan rate of 10 mV/s in absence and presence of 0.1 M oxalic acid. The CV in the absence of oxalic acid was used a control sample. All the potentials are reported vs. SHE and were calculated by adding 0.197 V to the potential measured using saturated Ag/AgCl electrode as the reference.

XPS Analyses

XPS spectra were acquired on a Kratos Axis DLD Ultra X-rayphotoelectron spectrometer using an Al Kα source monochromatic operating at 150 W with no charge compensation. The base pressure was about $2\times10^{-10}$ Torr, and operating pressure was around $2\times10^{-9}$ Torr. Survey and high-resolution spectra were acquired at pass energies of 80 and 20 eV respectively. Data analysis and quantification were performed using CasaXPS software. A linear background subtraction was used for quantification of Cls, Ols and N1s spectra, while a Shirley background was applied to Mn2p spectra. Sensitivity factors provided by the manufacturer were utilized. A 70% Gaussian/30% Lorentzian line shape was utilized in the curve-fit of N1s.

Computation Analysis

All the electronic structure calculations were performed using generalized gradient approximation (GGA) to density functional theory (DFT) with the Perdew-Burke-Ernzerhof (PBE) functional (Perdew, J. P. et al., Generalized Gradient Approximation Made Simple. Physical Review Letters, 1996. 77: p. 3865; and Perdew, J. P. et al., Erratum: Generalized Gradient Approximation Made Simple [Phys. Rev. Lett. 77, 3865 (1996)]. Physical Review Letters, 1997. 78: p. 1396) and projector augmented-wave pseudopotentials (Blöchl, P. E., Projector augmented-wave method. Phys. Rev. Lett., 1994. B 50: p. 17953; Kresse, G. et al., From ultrasoft pseudopotentials to the projector augmented-wave method. Phys. Rev. B., 1999. 59: p. 1758) as implemented in Vienna Ab initio Software Package (VASP) (Kresse, G. and J. Hafner, Ab initio molecular dynamics for liquid metals. Phys. Rev. B., 1993. 47: p. 558; Kresse, G. et al., Ab initio molecular-dynamics simulation of the liquid-metal-amorphous-semiconductor transition in germanium. Phys. Rev. B., 1994: p. 14251; Kresse, G et al., Efficiency of ab-initio total energy calculations for metals and semiconductors using a plane-wave basis set. Comput. Mat. Sci., 1996. 6: p. 15; Kresse, G. et al., Efficient iterative schemes for ab initio total-energy calculations using a plane-wave basis set. Physical Review B, 1996. 54: p. 11169). The electronic energies were calculated using a 3×3×1 k-point Monkhorts-Pack (Monkhorst, H. J. and J. D. Pack, Special points for Brillouin-zone integrations. Phys. Rev. B: Condens. Matter Mater Phys., 1976. 13: p. 5188) mesh and the tetrahedron method with Blöchl corrections (Blöchl, P. E. et al., Improved tetrahedron method for Brillouin-zone integrations. Phys. Rev. B: Condens. Matter Mater Phys., 1994. 49: p. 16223). In all cases, the plane-wave basis cutoff was set to 700 eV. Extended surfaces were modeled using super-cells with the dimensions of 17.04 Å×17.04 Å, γ=60) and a vacuum region of 20 Å. Using this approach, it was determined that the optimized extended graphene structure has a C—C distance of 1.42 Å, which is in agreement with previous experimental observations for graphite. Active sites of MnAAPyr were modeled by removing one C atom from the graphene in the case of $MnN_3$ and two adjacent C atoms in the case of $MnN_4$, $MnN_3C$, and $MnN_2C_2$ sites, respectively. The resulting internal edges were substituted with 3 N atoms, in the case of $MnN_3$ and $MnN_3C$ sites, 4N atoms in the case of $MnN_4$ site, and 2 N atoms in the case of $MnN_2C_2$ site. The structures were further coordinated to manganese atom and atoms were allowed to relax until the convergence in energy was $1\times10^{-5}$ eV. The lattice was kept fixed at the DFT optimized value for graphene. In the case of $MnN_2C_2$ sites, two possible coordinations of Mn were considered; one in which the manganese atom is coordinated with nitrogen atoms that are adjacent to each other, and the other in which Mn is coordinated with N atoms that are opposite to each other (FIG. 2).

Formation energies of proposed active sites of MnAAPyr were calculated based on the following set of reactions:

$$C_{n-graphene} \rightarrow C_{n-1} + C \tag{3a}$$

$$C_{n-1} \rightarrow C_{n-2} + C \tag{3b}$$

$$C_{n-2} + \frac{m}{2}N_2 \rightarrow N_mC_{n-2} + mC \tag{4a}$$

$$C_{n-1} + \frac{m}{2}N_2 \rightarrow N_mC_{n-1} + mC \tag{4b}$$

$$N_mC_{n-2} + Mn \rightarrow MnN_mC_{n-2} \tag{5a}$$

$$N_mC_{n-1} + Mn \rightarrow MnN_mC_{n-1} \tag{5b}$$

which sums to the final formation reaction $$C_{n-graphene} + \frac{m}{2}N_2 + Mn \rightarrow MnN_mC_{n-x} + C_x \tag{6}$$

where x is 1 or 2. Energy changes in each of the steps were calculated using the change in the electronic energy for the appropriate system. $C_{n\text{-}graphene}$, $N_mC_{n\text{-}1}$, and $MnN_mC_{n\text{-}1}$ correspond to the energies of pristine graphene sheet, optimized graphene with $N_mC_{n\text{-}1}$ defects, and optimized $N_mC_{n\text{-}1}$ defects with manganese atoms incorporated, respectively. For electronic energies of carbon, nitrogen, and manganese we used total energy per carbon atom for defect free graphene, half of the total energy of $N_2$ molecule, and total energy of an isolated Mn atom in the gas phase.

The mechanism of oxalic acid oxidation on the five considered active sites was further studied using BFT approach. The steps in the oxalic acid oxidation mechanism we considered are given in Eq. (9) and include transfer of two electrons directly from oxalic acid molecule to the catalyst surface. The change in the Gibbs free energy for all the steps in the mechanism were calculated using, the equation:

$$\Delta_r G = \Delta E + \Delta ZPE - T\Delta S \tag{7}$$

where ΔE is the change in the electronic energy during the reaction, ΔZPE is the change in the zero-point energy, and ΔS is the change in the entropy. ZPF values were calculated using the vibrational frequencies obtained from the normal mode analysis and entropy changes were obtained from standard molecular tables (Atkins, P. W., Physical Chemistry. 1998, Oxford: Oxford University Press). By the use of the standard hydrogen electrode, the chemical potential for proton/electron pair is related to that of the $\frac{1}{2}H_2(g)$ and the energy difference for the reaction $*A+H^++e^-\rightarrow *AH$ was, under standard conditions, calculated as the free energy change for the reaction $*A+\frac{1}{2}H_2\rightarrow *AH$ (Nørskov, J. K., et al., Origin of the Overpotential for Oxygen Reduction at a Fuel-Cell Cathode. J. Phys. Chem. B., 2004. 108: p. 17886; Rossmeisl, J. et al., Electrolysis of water on (oxidized) metal surfaces. Chemical Physics, 2005. 319: p. 178-184).

At finite pH and potential, the free energy change of the reaction becomes:

$$\Delta_r G=\Delta E+\Delta ZPE-T\Delta S-neU-k_B T \ln 10pH \quad (8)$$

where n is the number of electrons exchanged in the reaction and U is the electrode potential.

The docking of oxalic acid and oxalic anion in OxOx was modeled using Autodock Vina 4 (Trott, O. and A. J. Olson, AutoDock Vina: Improving the speed and accuracy of docking with a new scoring function, efficient optimization, and multithreading. Journal of Computational Chemistry 2009. 31(2): p. 455-461). The geometries of oxalic acid and oxalic anions in water were first optimized using MP2/6-311++G (d,p) level of theory and polarizable continuum solvation model as implemented in Gaussian09 (Frisch, M. J., et al., Gaussian 09, Revision B.01. 2009, Gaussian, Inc., Wallingford Conn.).

Catalyst Morphology

Figure 3A:
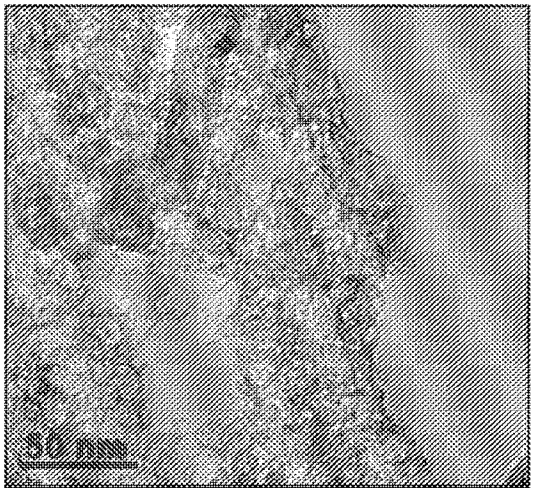
FIG. 3A shows morphological analysis of MnAAPyr catalyst by TEM.
Figure 3B:
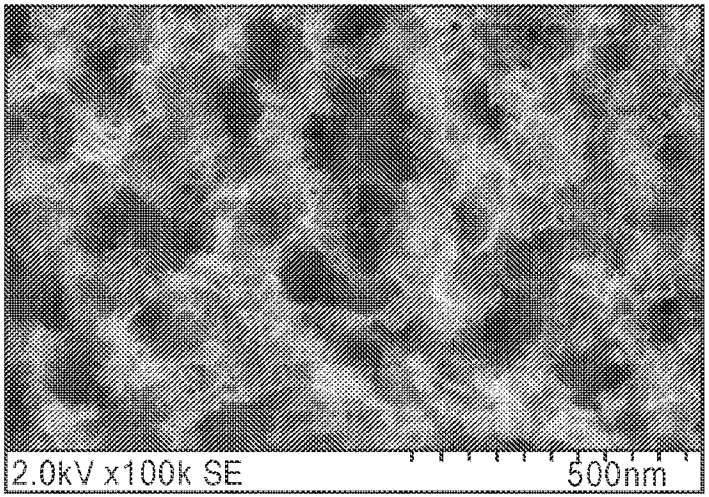
FIG. 3B shows morphological analysis of MnAAPyr catalyst by SEM.

Morphological analysis of MnAAPyr catalyst by TEM (FIG. 3A) revealed highly graphitic three-dimensional graphene-like structure typical for catalysts synthesized by SSM. The TEM image also indicates heterogeneous morphology, as it was further seen by SEM analysis. SEM showed highly developed 3D open-frame, sponge-like structure of the catalyst (FIG. 3B) with two types of pores: pores with diameter ~60-90 nm created after removal of sacrificial support, and smaller pores ~10-15 nm formed during the decomposition of the precursor.

Surface Chemistry

Figure 4A:
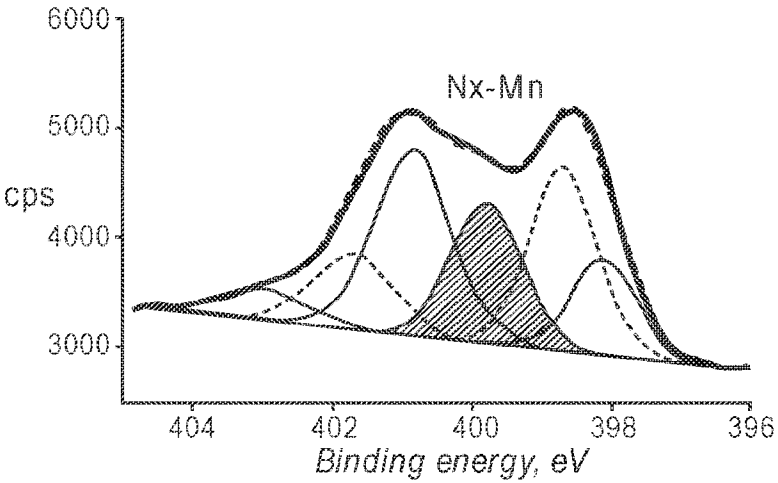
FIG. 4A shows the N is spectrum data for MnAAPyr.
Figure 4B:
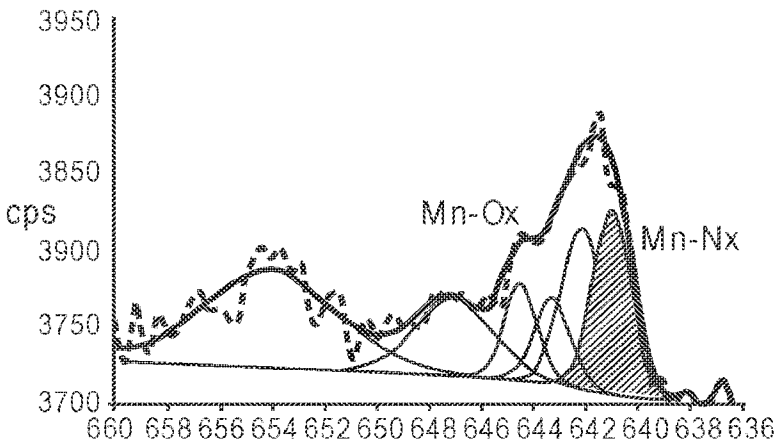
FIG. 4B shows

XPS analysis of the synthesized MnAAPyr detected the presence of 7.4 at. % of nitrogen and 0.2 at. % of manganese (Table 1). The N is spectrum in FIG. 4A shows the following major types of N (above 20%): pyridinic (398.8 eV), Mn—$N_x$ (399.8 eV), and pyrrolic (401 eV). The high abundance of Mn—N bonds indicated Mn—$N_x$ coordination of the active center. Mn 2p spectra showed six main peaks, where the major peaks were due to Mn associated with nitrogen (Mn—$N_x$) and oxygen, such as $MnO_2$ or $Mn_3O_4$.

Figure 5:
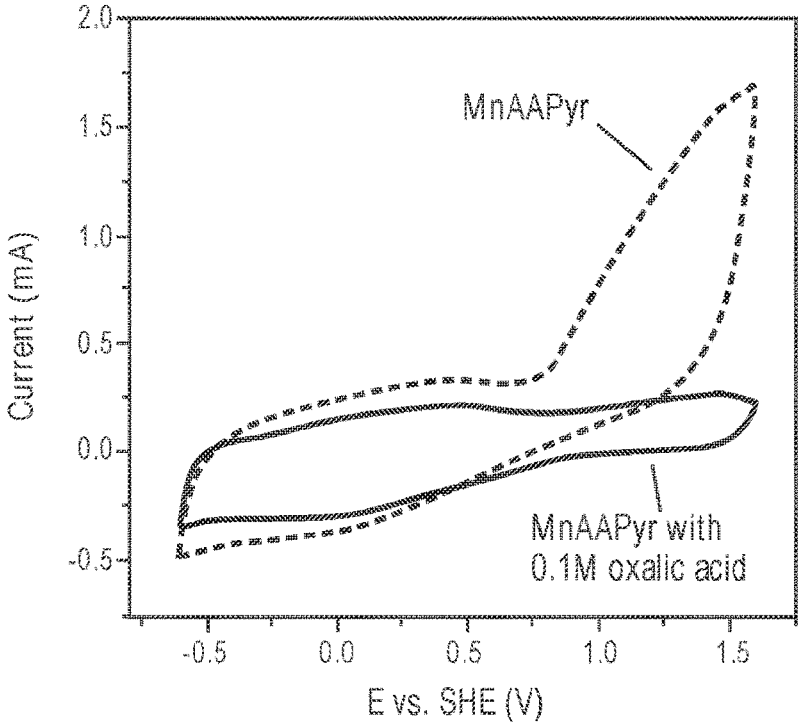
FIG. 5 shows the activity of the MnAAPyr catalyst towards oxalate oxidation was studied using cyclic voltammetry at pH 4.

(Rockombeny, L. C., et al., Electrochemical oxidation of oxalic acid and hydrazinium nitrate on platinum in nitric acid media. Electrochimica Acta, 2012. 66: p. 230-238) and even higher than the currents recorded at platinum single crystal electrodes (Bern, A. et al., Oxalic acid adsorption and oxidation at single crystal electrodes. Journal of Electroanalytical Chemistry, 2004, 563: p. 49-62.). The activity of the MnAAPyr catalyst towards oxalate oxidation was studied using cyclic voltammetry at pH 4 (FIG. 5). The pH was selected based on the optimal pH for oxalate oxidation through enzymatic catalysis. At pH 4, oxalic acid is partially deprotonated ($pKa_1$=1.23 and $pKa_2$=4.19). Therefore oxalic acid and oxalic anions are present in the electrolyte.

Comparing the anodic currents in absence and presence of 0.1 M oxalic acid it can be concluded that at pH 4 MnAAPyr is electrochemically active towards the oxidation of oxalic acid. The onset potential of the redox transformation of the oxalate was found to be 0.714±0.002 V vs. SHE. This onset potential is similar to the potential of 0.7 V vs. RHE at which oxalate oxidation on platinum can be observed in highly acidic media (pH<1), which is 4 times lower pH than the one described herein. It is also known that the Pt activity is pH dependent and decreases at higher pHs. Thus the developed herein catalyst shows lower overpotential towards oxalate oxidation in comparison to Pt.

On the CV of MnAAPyr in phosphate buffer before and after the addition of oxalic acid two broad redox peaks were recorded. The oxidation peak appeared at 0.470±0.01 V, followed by a reduction peak at 0.048±0.003 V vs. SHE. The presence of these peaks indicates a redox couple with formal redox potential of 0.259±0.004 V vs. SHE. Based on possible redox states, this redox couple could be $Mn^{3+}/Mn^{2+}$ or $Mn^{4+}/Mn^{3+}$ (Yamaguchi, K. S. et al., The Redox Chemistry of Manganese(III) and -(IV) Complexes. Israel Journal of Chemistry, 1985. 25: p. 164-176; Cha, D. K. et al., Strong Oxidants for Organic Waste Destruction from Oxidation of Manganese and Hydroxide in Conference: 9. Annual conference on hazardous waste remediation. 1994. Bozeman, Mont., USA).

The generated currents due to the oxidation of oxalic acid on MnAAPyr are comparable with the currents obtained using Pt, a benchmark catalyst, at pH 1 and 1000 rpm (Rockombeny, L. C., et al., Electrochemical oxidation of oxalic acid and hydrazinium nitrate on platinum in nitric acid media. Electrochimica Acta, 2012. 66: p. 230-238) and even higher than the currents recorded at platinum single crystal electrodes (Bern, A. et al, Oxalic acid adsorption and oxidation at single crystal electrodes. Journal of Electroanalytical Chemistry, 2004. 563: p. 49-62.)

Example II—Cu-AAPyr

Figure 6:
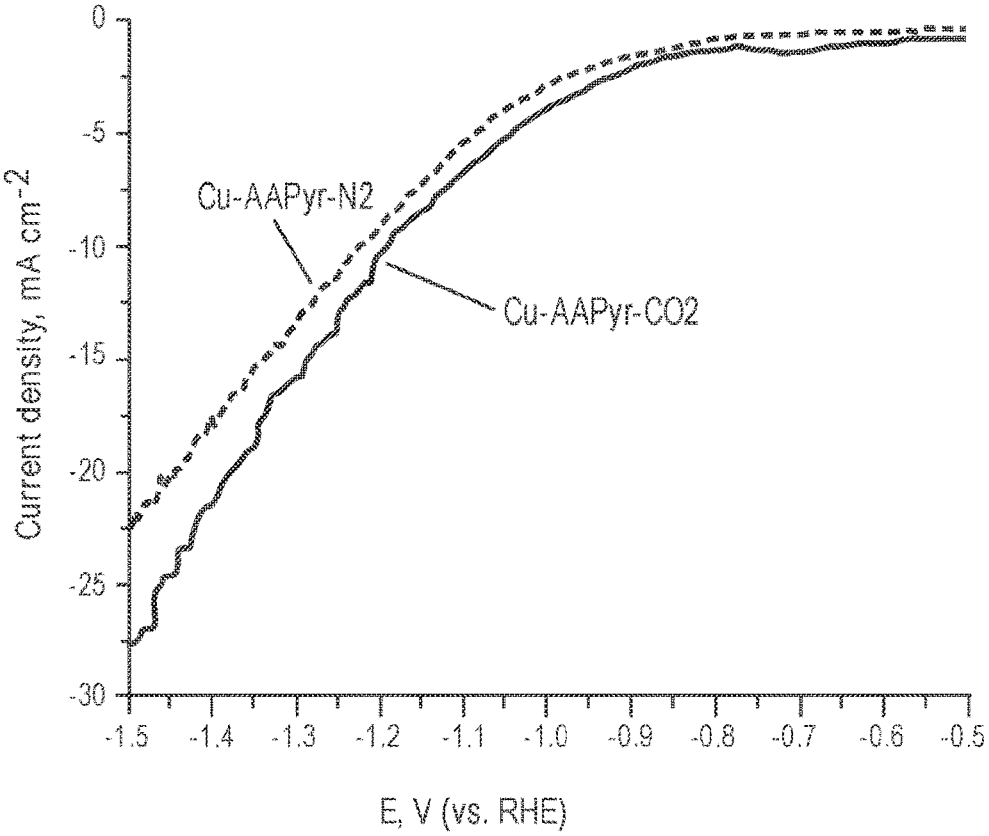
FIG. 6 shows steady-state polarization curves for $CO_2$ electroreduction by Cu-AAPyr catalyst in 0.5M $NaHCO_3$ (2500 RPM, RT, 200 μg $cm^{-2}$) for $N_2$ and $CO_2$.

Cu-AAPyr was synthesized using the procedures described above substituting a Cu-salt for the Mn-salt. FIG. 6 shows steady-state polarization curves for $CO_2$ electroreduction in 0.5M $NaHCO_3$ (2500 RPM, RT, 200 μg $cm^{-2}$) for $N_2$ and $CO_2$.

TABLE 1

XPS data for MnAAPyr catalyst

| Sample | C 1s % | O 1s % | N 1s % | Mn 2p % | N cyano % | N pyrid % | N—Mn % | N pyrrolic % | N qua % | N graph % | Mn—N % | $MnO_2$ % |
|---|---|---|---|---|---|---|---|---|---|---|---|---|
| Mn AAPyr 1 | 87.6 | 4.4 | 7.8 | 0.2 | 12.3 | 24.1 | 19.2 | 27.8 | 11.4 | 5.2 | 52.8 | 47.2 |
| Mn AAPyr 2 | 86.7 | 5.9 | 7.2 | 0.2 | 11.6 | 24.4 | 20.5 | 27.1 | 11.4 | 5.0 | 57.9 | 42.1 |
| Mn AAPyr 3 | 87.0 | 5.6 | 7.2 | 0.1 | 10.7 | 24.8 | 20.8 | 27.0 | 11.6 | 5.2 | 47.1 | 52.9 |
| | 87.1 | 5.3 | 7.4 | 0.2 | 11.5 | 24.4 | 20.2 | 27.3 | 11.5 | 5.1 | 52.6 | 47.4 |

Figure 7:
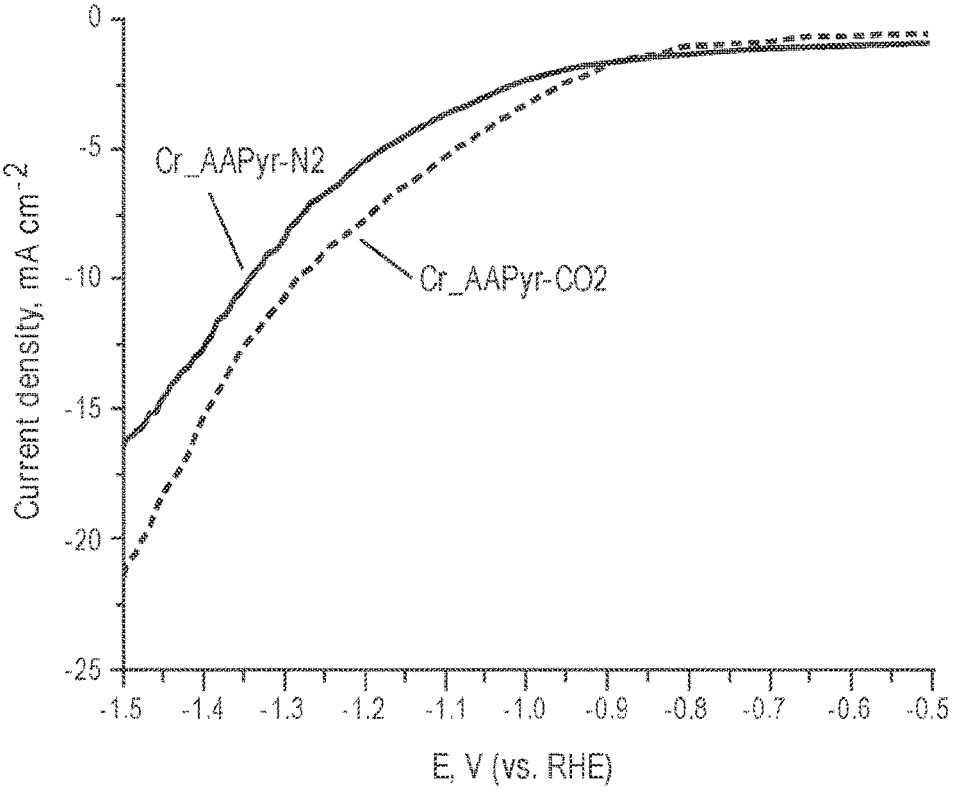
FIG. 7 shows steady-state polarization curves for $CO_2$ electroreduction by Cr-AAPyr catalyst in 0.5M $NaHCO_3$ (2500 RPM, RT, 200 μg $cm^{-2}$) for $N_2$ and $CO_2$.

The generated currents due to the oxidation of oxalic acid on MnAAPyr are comparable with the currents obtained using Pt, a benchmark catalyst, at pH 1 and 1000 rpm Example III—Cr-AAPyr Cr-AAPyr was synthesized using the procedures described above substituting a Cr-salt for the Mn-salt. FIG. 7 shows steady-state polarization curves for $CO_2$ electroreduction in 0.5M $NaHCO_3$ (2500 RPM, RT, 200 μg $cm^{-2}$) for $N_2$ and $CO_2$.

Example IV—Fe-AAPyr

Figure 8:
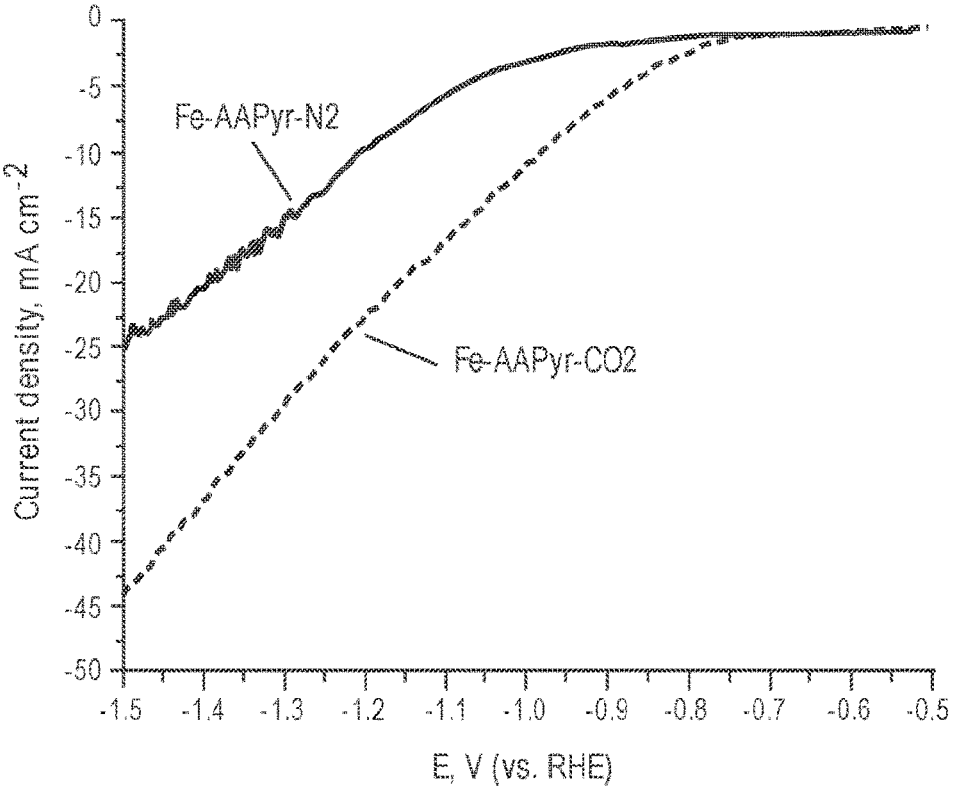
FIG. 8 shows steady-state polarization curves for $CO_2$ electroreduction by Fe-AAPyr catalyst in 0.5M $NaHCO_3$ (2500 RPM, RT, 200 μg $cm^{-2}$) for $N_2$ and $CO_2$.
Figure 9:
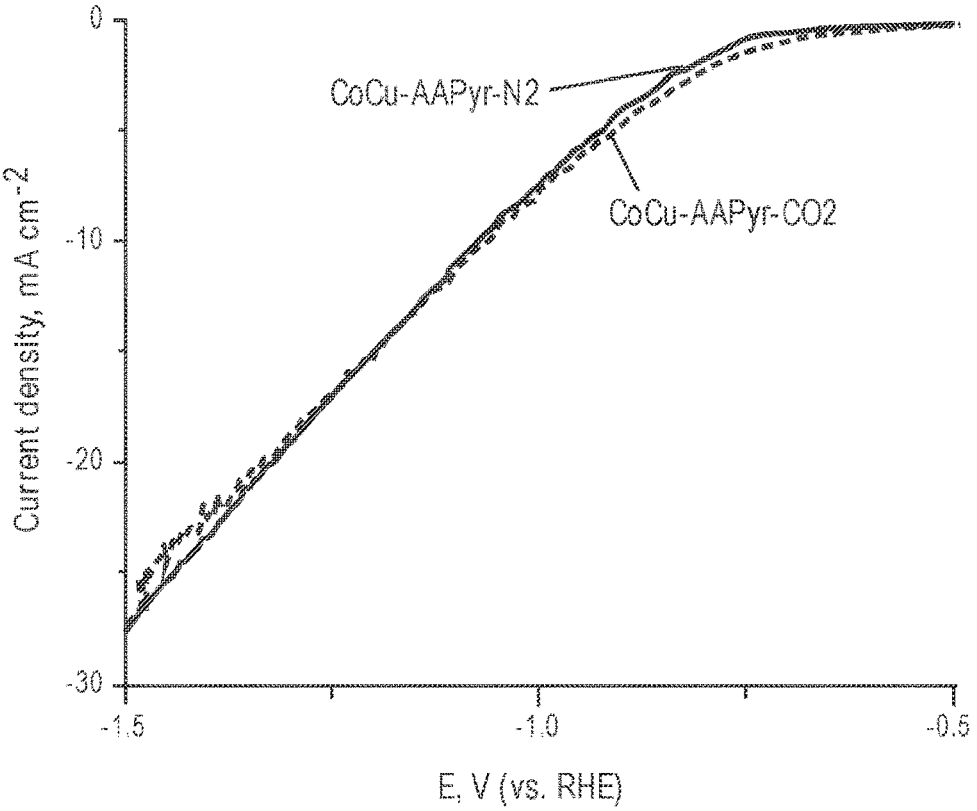
FIG. 9 shows steady-state polarization curves for $CO_2$ electroreduction by CoCu-AAPyr catalyst in 0.5M $NaHCO_3$ (2500 RPM, RT, 200 μg $cm^{-2}$) for $N_2$ and $CO_2$.

Fe-AAPyr was synthesized using the procedures described above substituting a Fe-salt for the Mn-salt. FIG. 8 shows steady-state polarization curves for $CO_2$ electroreduction in 0.5M $NaHCO_3$ (2500 RPM, RT, 200 μg $cm^{-2}$) for $N_2$ and $CO_2$.

Example V—CoCu-AAPyr

CoCu-AAPyr was synthesized using the procedures described above substituting salts of Co and Cu for the Mn-salt. FIG, 9 shows steady-state polarization curves for $CO_2$ electroreduction in 0.5M $NaHCO_3$ (2500 RPM, RT, 200 μg $cm^{-2}$) for $N_2$ and $CO_2$.

Example VI—CoMn-AAPyr

Figure 10:
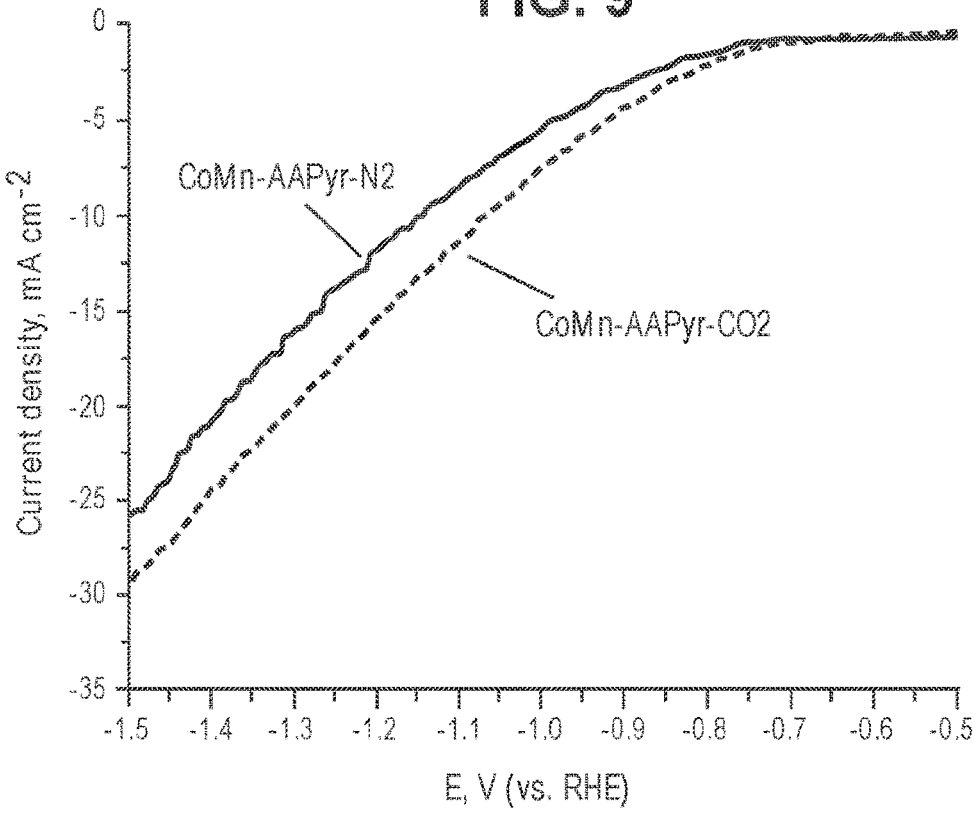
FIG. 10 shows steady-state polarization curves for $CO_2$ electroreduction by CoMn-AAPyr catalyst in 0.5M $NaHCO_3$ (2500 RPM, RT, 200 μg $cm^{-2}$) for $N_2$ and $CO_2$.

CoMn-AAPyr was synthesized using the procedures described above mixing Co-salt with the Mn-salt. FIG. 10 shows steady-state polarization curves for $CO_2$ electroreduction in 0.5M $NaHCO_3$ (2500 RPM, RT, 200 μg $cm^{-2}$) for $N_2$ and $CO_2$.

Example VII—CoMn-AAPyr

Figure 11:
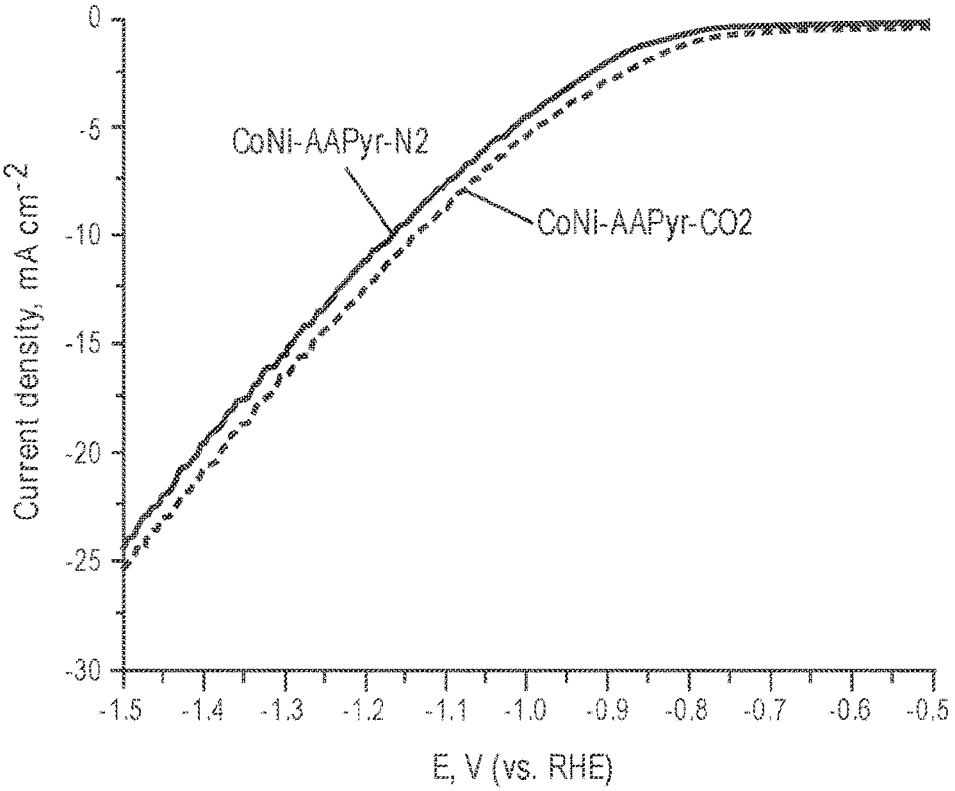
FIG. 11 shows steady-state polarization curves for $CO_2$ electroreduction by CoMn-AAPyr catalyst in 0.5M $NaHCO_3$ (2500 RPM, RT, 200 μg $cm^{-2}$) for $N_2$ and $CO_2$.

CoNi-AAPyr was synthesized using the procedures described above substituting salts of Co and Ni for the Mn-salt. FIG. 11 shows steady-state polarization curves for $CO_2$ electroreduction in 0.5M NaHCO, (2500 RPM, RT, 200 μg, $cm^{-2}$) for $N_2$ and $CO_2$.

Example VIII—FeCo-AAPyr

Figure 12:
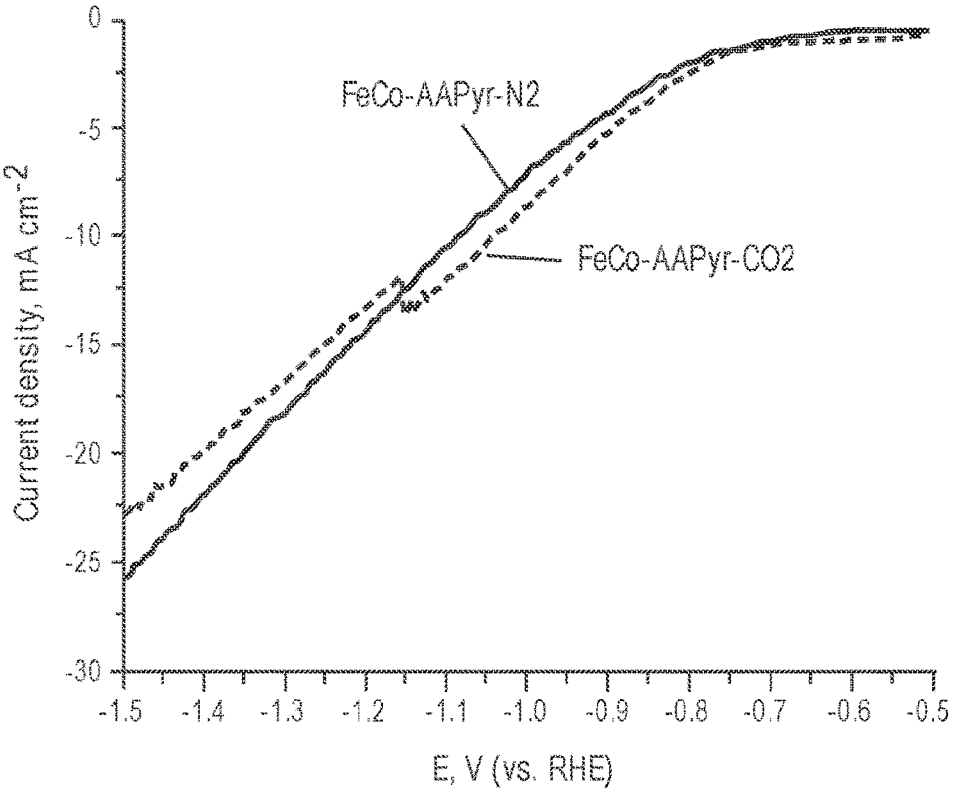
FIG. 12 shows steady-state polarization curves for $CO_2$ electroreduction by FeCo-AAPyr catalyst in 0.5M $NaHCO_3$ (2500 RPM, RT, 200 μg $cm^{-2}$) for $N_2$ and $CO_2$.

FeCo-AAPyr was synthesized using the procedures described above substituting salts of Fe and Co for the Mn-salt. FIG. 12 shows steady-state polarization curves for $CO_2$ electroreduction in 0.5M $NaHCO_3$ (2500 RPM, RT, 200 μg $cm^{-2}$) for $N_2$ and $CO_2$.

Example IX—FeCr-AAPyr

Figure 13:
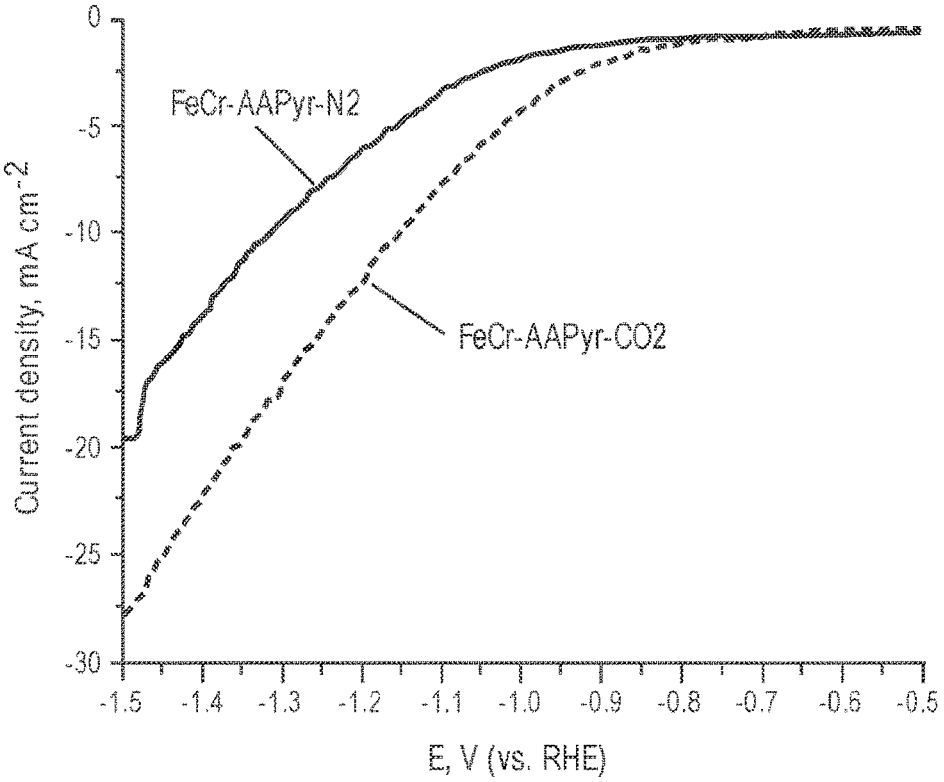
FIG. 13 shows steady-state polarization curves for $CO_2$ electroreduction by FeCr-AAPyr catalyst in 0.5M $NaHCO_3$ (2500 RPM, RT, 200 μg $cm^{-2}$) for $N_2$ and $CO_2$.

FeCr-AAPyr was synthesized using the procedures described above substituting salts of Fe and Cr for the Mn-salt. FIG. 13 shows steady-state polarization curves for $CO_2$ electroreduction in 0.5M $NaHCO_3$ (2500 RPM, RT, 200 μg $cm^{-2}$) for $N_2$ and $CO_2$.

Example X—FeCu-AAPyr

Figure 14:
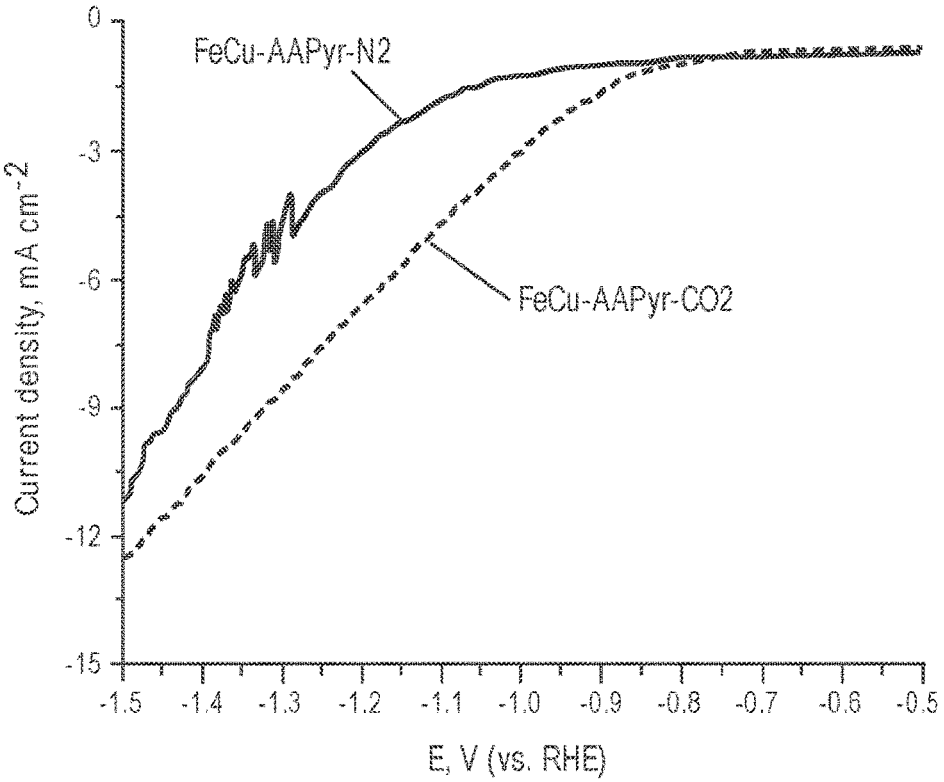
FIG. 14 shows steady-state polarization curves for $CO_2$ electroreduction by FeCu-AAPyr catalyst in 0.5M $NaHCO_3$ (2500 RPM, RT, 200 μg $cm^{-2}$) for $N_2$ and $CO_2$.

FeCu-AAPyr was synthesized using the procedures described above substituting salts of Fe and Cu for the Mn-salt. FIG. 14 shows steady-state polarization curves for $CO_2$ electroreduction in 0.5M $NaHCO_3$ (2500 RPM, RT, 200 μg $cm^{-2}$) for $N_2$ and $CO_2$.

Example XI—FeNi-AAPyr

Figure 15:
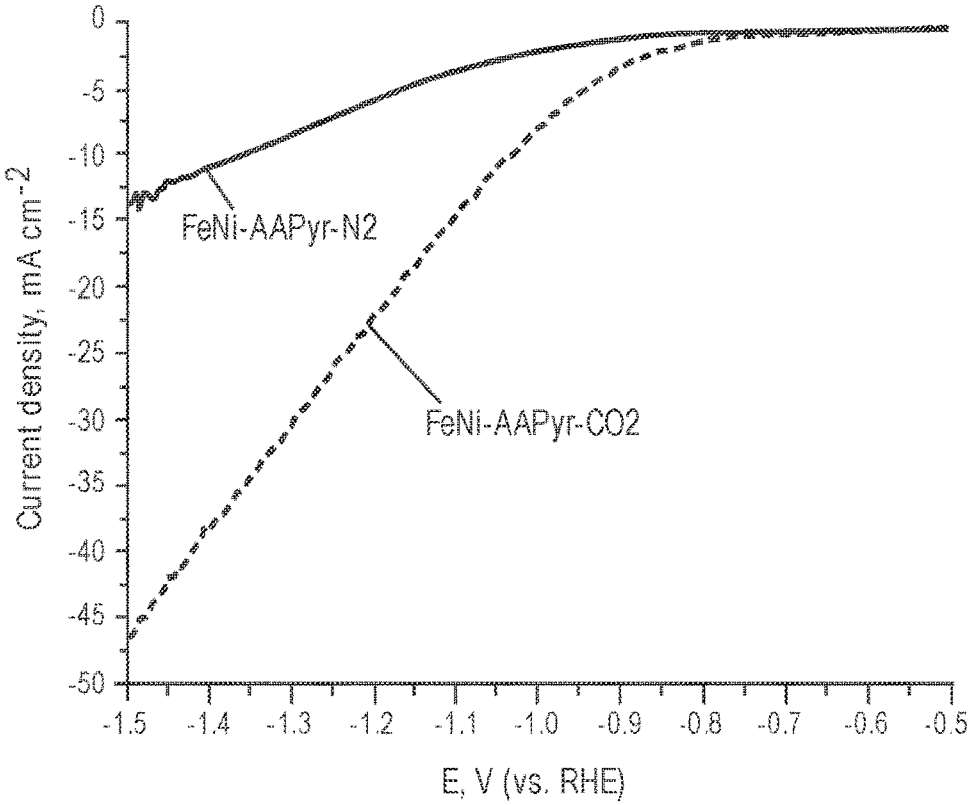
FIG. 15 shows steady-state polarization curves for $CO_2$ electroreduction by FeNi-AAPyr catalyst in 0.5M $NaHCO_3$ (2500 RPM, RT, 200 μg $cm^{-2}$) for $N_2$ and $CO_2$.

FeNi-AAPyr was synthesized using the procedures described above substituting salts of Fe and Ni for the Mn-salt. FIG. 15 shows steady-state polarization curves for $CO_2$ electroreduction in 0.5M $NaHCO_3$ (2500 RPM, RT, 200 μg $cm^{-2}$) for $N_2$ and $CO_2$.

Example XII—FeCoCr-AAPyr

Figure 16:
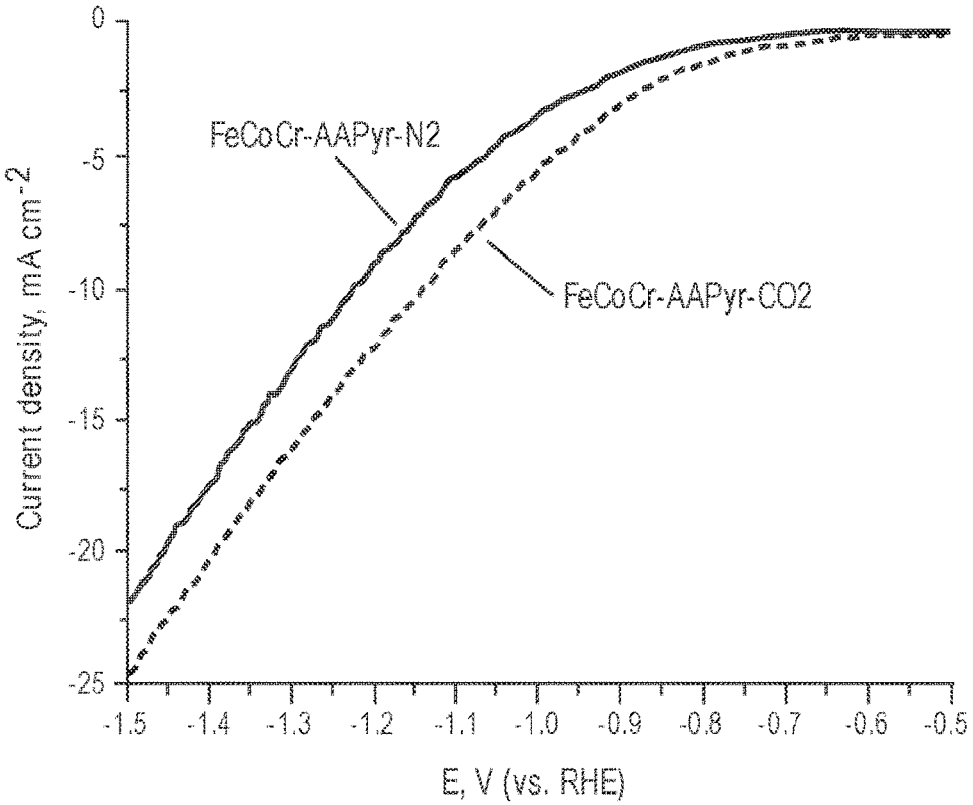
FIG. 16 shows steady-state polarization curves for $CO_2$ electroreduction by FeCoCr-AAPyr catalyst in 0.5M $NaHCO_3$ 2500 RPM, RT, 200 μg $cm^2$) for $N_2$ and $CO_2$.

FeCoCr-AAPyr was synthesized using the procedures described above substituting salts of Fe, Co, and Cr for the Mn-salt. FIG. 16 shows steady-state polarization curves for $CO_2$ electroreduction in 0.5M $NaHCO_3$ (2500 RPM, RT, 200 μg $cm^{-2}$) for $N_2$ and $CO_2$.

Example XIII—FeCoMn-AAPyr

Figure 17:
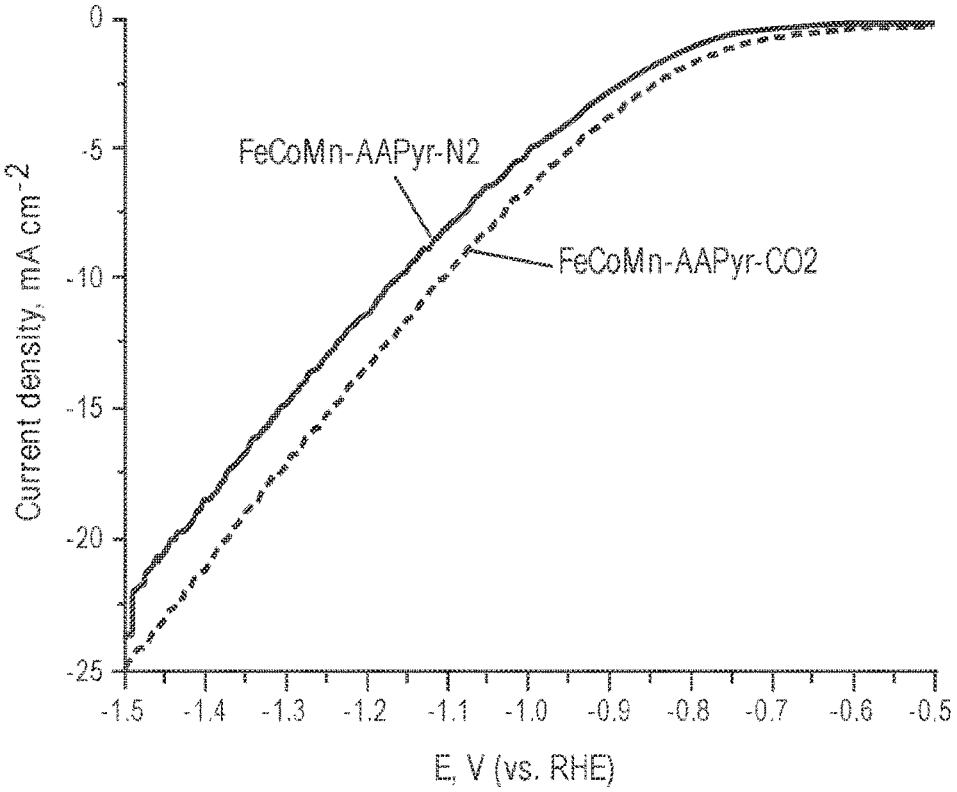
FIG. 17 shows steady-state polarization curves for $CO_2$ electroreduction by FeCoMn-AAPyr catalyst in 0.5M $NaHCO_3$ 2500 RPM, RT, 200 μg $cm^2$) for $N_2$ and $CO_2$.

FeCoMn-Aapyr was synthesized using the procedures described above adding salts of Fe and Co to the Mn salt. FIG. 17 shows steady-state polarization curves for $CO_2$ electroreduction in 0.5M $NaHCO_3$ (2500 RPM, RT, 200 μg $cm^{-2}$) for $N_2$ and $CO_2$.

Example XIV—FeCoCr-AAPyr

Figure 18:
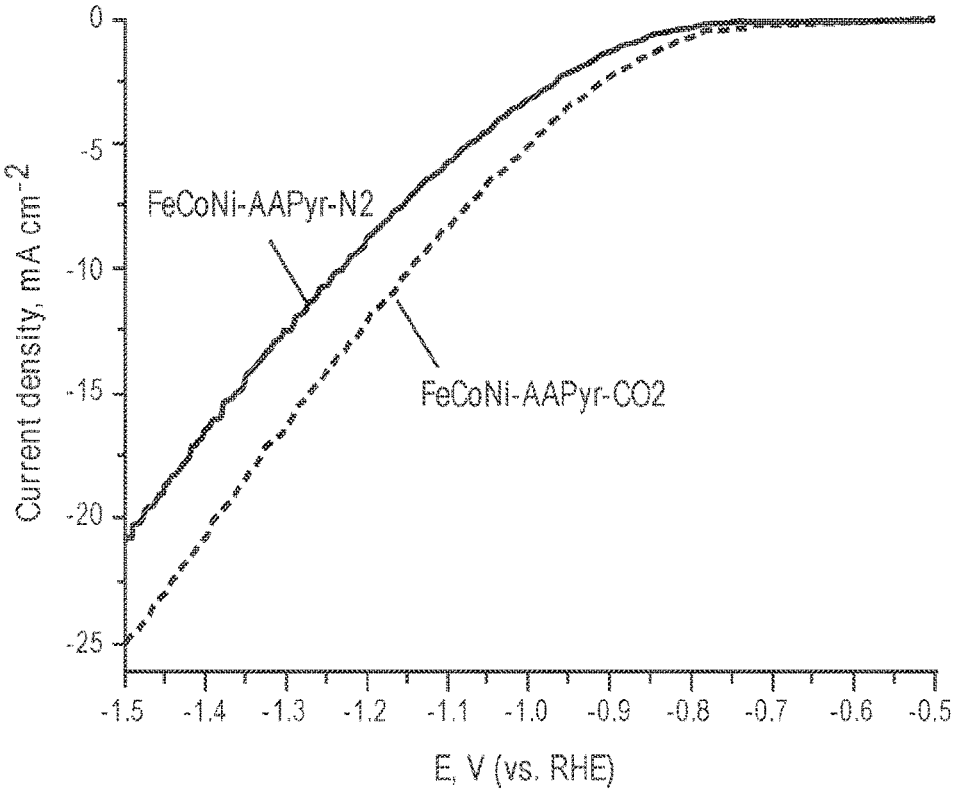
FIG. 18 shows steady-state polarization curves for $CO_2$ electroreduction by FeCoCr-AAPyr catalyst in 0.5M $NaHCO_3$ 2500 RPM, RT, 200 μg $cm^2$) for $N_2$ and $CO_2$.

FeCoNi-Aapyr was synthesized using the procedures described above substituting salts of Fe, Co, and Ni for the Mn-salt. FIG. 18 shows steady-state polarization curves for $CO_2$ electroreduction in 0.5M $NaHCO_3$ (2500 RPM, RT, 200 μg $cm^{-2}$) for $N_2$ and $CO_2$.

Example XV—FeCrCu-AAPyr

Figure 19:
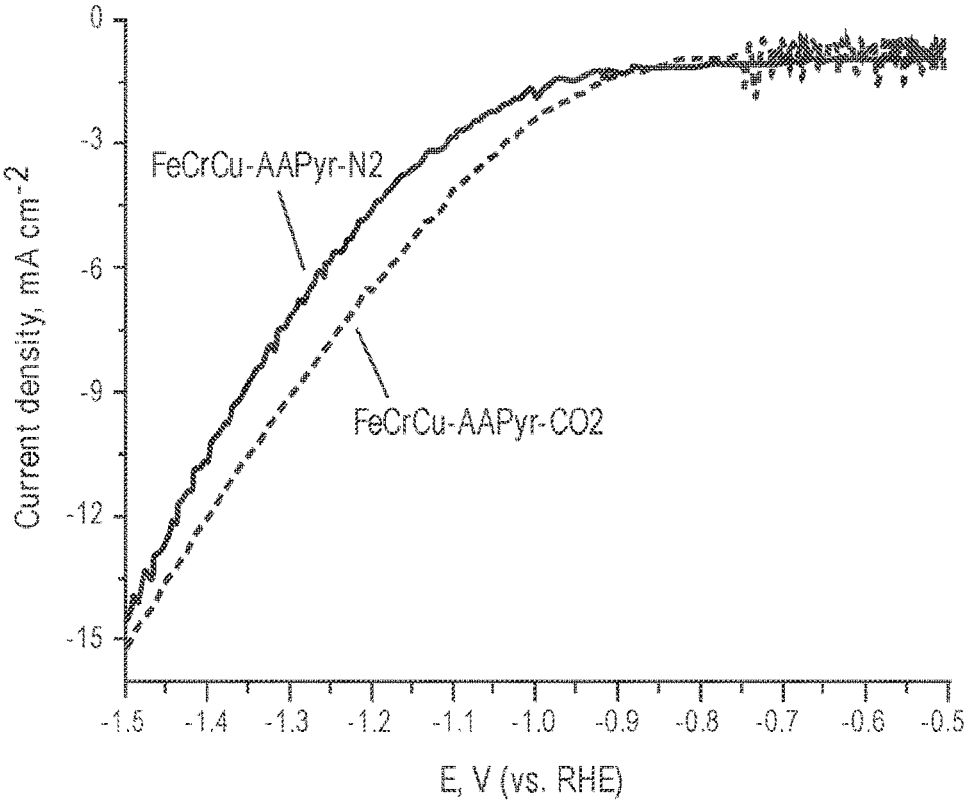
FIG. 19 shows steady-state polarization curves for $CO_2$ electroreduction by FeCrCu-AAPyr catalyst in 0.5M $NaHCO_3$ 2500 RPM, RT, 200 μg $cm^{-2}$) for $N_2$ and $CO_2$.

FeCrCu-Aapyr was synthesized using the procedures described above substituting salts of Fe, Cr, and Cu for the Mn-salt. FIG. 19 shows steady-state polarization curves for $CO_2$ electroreduction in 0.5M $NaHCO_3$ (2500 RPM, RT, 200 μg $cm^{-2}$) for $N_2$ and $CO_2$.

Example XVI—FeCoMn-AAPyr

Figure 20:
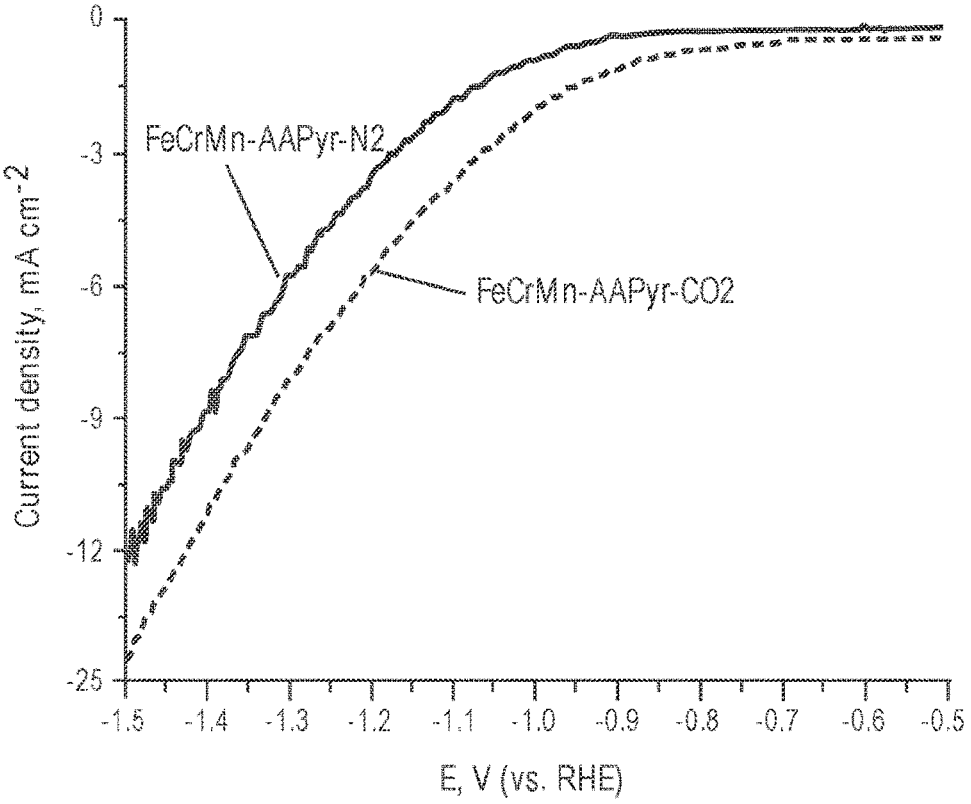
FIG. 20 shows steady-state polarization curves for $CO_2$ electroreduction by FeCoMn-AAPyr catalyst in 0.5M $NaHCO_3$ (2500 RPM, RT, 200 μg $cm^{-2}$) for $N_2$ and $CO_2$.

FeCrMa AAPyr was synthesized using the procedures described above adding salts of Fe and Cr to the Mn salt. FIG. 20 shows steady-state polarization curves for $CO_2$ electroreduction in 0.5M $NaHCO_3$ (2500 RPM, RT, 200 μg $cm^{-2}$) for $N_2$ and $CO_2$.

Example XVI—Fe—NCB

Figure 21:
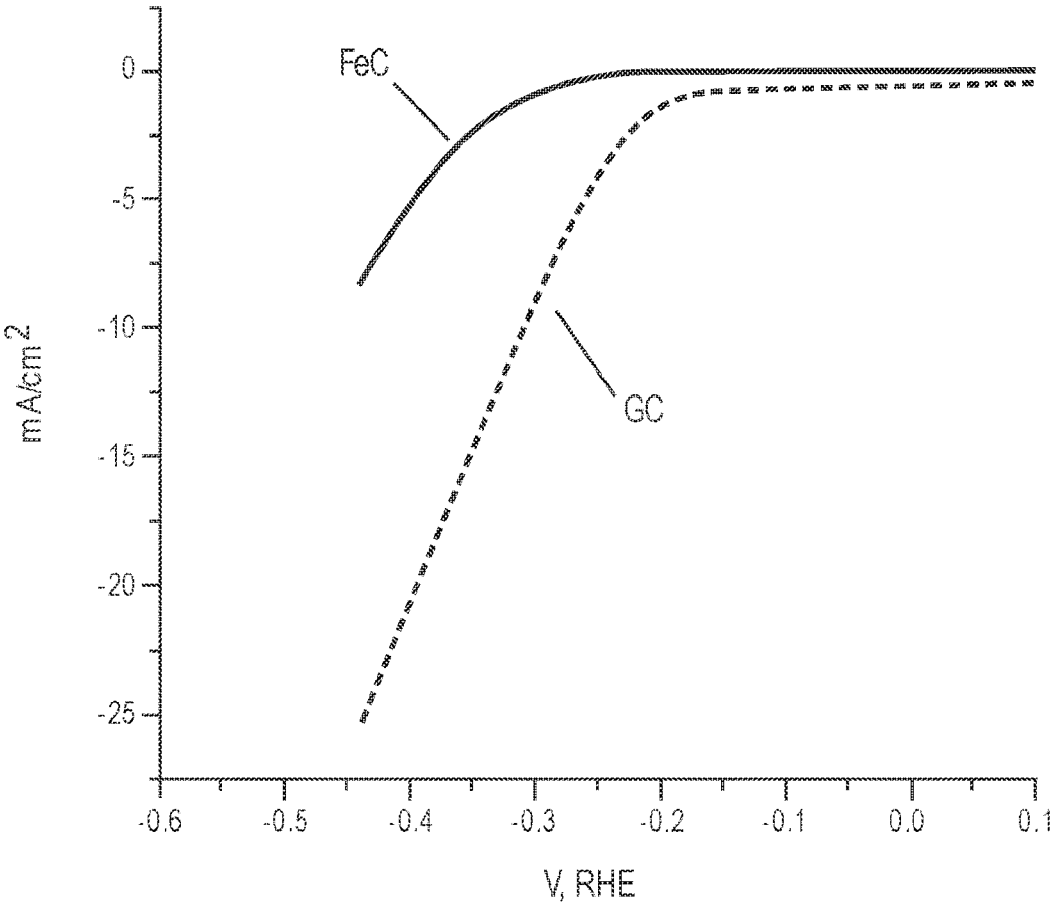
FIG. 21 shows steady-state polarization curves for $H_2$ evolution Fe—NCB catalyst in 1M $H_2SO_4$ electrolyte (1600 RPM, RT, 200 μg $cm^{-2}$).

Fe—NCB was synthesized using the procedures described above adding salts of Fe and Nicarbazin (NCB) N—C precursor. FIG. 21 shows steady-state polarization curves for $H_2$ evolution in 1M $H_2SO_4$ electrolyte (1600 RPM, RT, 200 μg $cm^{-2}$).

What is claimed is:

1. A method for chemical and electrochemical conversion and transformation of chemicals, molecules, or compounds by supplying carbon dioxide ($CO_2$), carbon monoxide (CO), water, oxygen, hydrogen, oxyfuels or organic/inorganic molecules to a reactor comprising a metal-heteroatom-carbon (M-X—C) catalyst *comprising a plurality of atomically dispersed single atom metal moieties coordinated with heteroatomic and carbon moieties* under electrocatalytic or chemical catalytic conditions at which the catalyst catalyzes/promotes an oxidation, reduction, conversion reaction, an oxygen reduction or evolution reaction, a hydrogen oxidation or evolution reaction, or electrolysis;

wherein the metal is Mn.

[2. The method of claim 1 wherein the M-X—C catalyst is a morphologically designed porous, self-supported solid-phase material comprising atomically dispersed transition metal moieties coordinated with heteroatomic moieties or heteroatomic and carbon moieties.]

3. The method of claim 1 wherein the catalyst is formed by:

dispersing sacrificial particles in a buffer and forming a colloidal solution therefrom;

forming a rigid three-dimensional structure from the colloidal solution; and removing the sacrificial particles from the rigid three-dimensional structure.

4. The method of claim 1 wherein the oxyfuel is selected from the group consisting of oxalic acid, oxalate, formate, formic acid, methanol, ethanol, 2-propanol, pyruvate, ethylene glycol, malate and tartrate.

5. The method of claim 1 wherein the chemical or compound is $CO_2$ or CO, [$N_2O$] and the catalyzed reaction is a reduction reaction.

6. The method of claim 5 wherein M-X—C catalyst is formed from precursors of 4-Aminoantipyrine and [a metal] *Mn*.

7. The method of claim 1 wherein the chemical or compound is an oxyfuel and the reaction is an oxidation or reduction reaction.

8. The method of claim 1 wherein the chemical or compound is an organic airborne contaminant and the reaction is an oxidation or reduction reaction.

9. The method of claim 1 wherein the chemical or compound is an organic wastewater contaminant and the reaction is an oxidation or reduction reaction.

10. The method of claim 1 wherein the chemical or compound is an organic agricultural feedstock bio-component and the reaction is an oxidation or reduction reaction.

11. A method for chemical and electrochemical conversion and transformation of chemicals, molecules, or compounds by supplying carbon dioxide ($CO_2$), carbon monoxide (CO), water, oxygen, hydrogen, oxyfuels or organic/inorganic molecules to a reactor comprising a metal-heteroatom-carbon (M-X—C) catalyst *comprising a plurality of atomically dispersed single atom metal moieties coordinated with heteroatomic and carbon moieties* under electrocatalytic or chemical catalytic conditions at which the catalyst catalyzes/promotes an oxidation, reduction, conversion reaction, an oxygen reduction or evolution reaction, a hydrogen oxidation or evolution reaction, or electrolysis;

[wherein the metal is selected from the group consisting of Ce, Cr, Cu, Co, Mo, Ni, Ru, Rh, Pd, Pt, Ir, Os, Ag, Au, Nb, Ta, Ti, V, W, Mn, Zn, Sn, Sb, and Zr;]

wherein the M-X—C [catalysts] *catalyst* comprises a multi-metal active site, wherein the multi-metal active site comprises more than one type of metal moiety;

and wherein the more than one type of metal moiety comprises Mn.

[12. The method of claim 11 wherein the M-X—C catalyst is a morphologically designed porous, self-supported solid-phase material comprising atomically dispersed transition metal moieties coordinated with heteroatomic moieties or heteroatomic and carbon moieties.]

13. The method of claim 11 wherein the oxyfuel is selected from the group consisting of oxalic acid, oxalate, formate, formic acid, methanol, ethanol, 2-propanol, pyruvate, ethylene glycol, malate and tartrate.

14. The method of claim 11 wherein the chemical or compound is $CO_2$ or CO, [$N_2O$] and the catalyzed reaction is a reduction reaction.

15. The method of claim 14 wherein M-X—C catalyst is formed from precursors of 4-Aminoantipyrine and [a metal] *Mn*.

16. The method of claim 11 wherein the chemical or compound is an oxyfuel and the reaction is an oxidation or reduction reaction.

17. The method of claim 11 wherein the chemical or compound is an organic airborne contaminant and the reaction is an oxidation or reduction reaction.

18. The method of claim 11 wherein the chemical or compound is an organic wastewater contaminant and the reaction is an oxidation or reduction reaction.

19. The method of claim 11 wherein the chemical or compound is an organic agricultural feedstock bio-component and the reaction is an oxidation or reduction reaction.

20. A method for chemical and electrochemical conversion and transformation of chemicals, molecules, or compounds by supplying carbon dioxide ($CO_2$) to a reactor comprising a metal-heteroatom-carbon (M-X—C) catalyst *comprising a plurality of atomically dispersed single atom metal moieties coordinated with heteroatomic and carbon moieties* under electrocatalytic or chemical catalytic conditions at which the catalyst catalyzes/promotes an oxidation, reduction, conversion reaction, an oxygen reduction or evolution reaction, a hydrogen oxidation or evolution reaction, or electrolysis;

wherein the metal is Mn.

21. The method of claim 20 wherein the M-X—C catalyst is a morphologically designed porous, self-supported solid-phase material comprising atomically dispersed transition metal moieties coordinated with heteroatomic moieties or heteroatomic and carbon moieties.

22. The method of claim 21 wherein the catalyst is formed by:

dispersing sacrificial particles in a buffer and forming a colloidal solution therefrom;

forming a rigid three-dimensional structure from the colloidal solution; and removing the sacrificial particles from the rigid three-dimensional structure.

*23. The method of claim 11 wherein the multi metal active site further comprises at least one of Ce, Cr, Cu, Co, Mo, Ni, Ru, Rh, Pd, Pt, Ir, Os, Ag, Au, Nb, Ta, Ti, V, W, Zn, Sn, Sb, or Zr.*

* * * * *